United States Patent
Shen et al.

(10) Patent No.: US 10,051,484 B2
(45) Date of Patent: Aug. 14, 2018

(54) SYNCHRONIZATION SIGNAL TRANSMITTING METHOD AND BASE STATION APPARATUS

(71) Applicant: NTT DOCOMO, INC., Tokyo (JP)

(72) Inventors: Jiyun Shen, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 14 days.

(21) Appl. No.: 14/912,762

(22) PCT Filed: Aug. 19, 2014

(86) PCT No.: PCT/JP2014/071632
§ 371 (c)(1),
(2) Date: Feb. 18, 2016

(87) PCT Pub. No.: WO2015/025838
PCT Pub. Date: Feb. 26, 2015

(65) Prior Publication Data
US 2016/0212631 A1    Jul. 21, 2016

(30) Foreign Application Priority Data
Aug. 20, 2013 (JP) ................................. 2013-170814

(51) Int. Cl.
*H04W 16/28* (2009.01)
*H04W 56/00* (2009.01)

(52) U.S. Cl.
CPC ......... *H04W 16/28* (2013.01); *H04W 56/001* (2013.01)

(58) Field of Classification Search
None
See application file for complete search history.

(56) References Cited

U.S. PATENT DOCUMENTS

| 8,514,971 B2 | 8/2013 | Higuchi et al. |
| 8,731,555 B2 | 5/2014 | Yokoyama |

(Continued)

FOREIGN PATENT DOCUMENTS

| JP | 2008-236429 A | 10/2008 |
| JP | 2009-159214 A | 7/2009 |
| WO | 2013/024852 A1 | 2/2013 |

OTHER PUBLICATIONS

International Search Report issued in PCT/JP2014/071632 dated Nov. 25, 2014 (2 pages).

(Continued)

*Primary Examiner* — Robert C. Scheibel
(74) *Attorney, Agent, or Firm* — Osha Liang LLP

(57) ABSTRACT

In order to make full use of the performance of a Massive-MIMO-applied communication system, provided is a base station apparatus for controlling a transmission direction of a transmission beam for a synchronization signal used in cell search by beamforming using a plurality of antenna elements. The base station apparatus has a synchronization signal processing section (62) that generates the synchronization signal including information to identify the transmission beam for the synchronization signal and changes a beamforming weight for the synchronization signal at every given time interval; and a transmission section (64) that transmits the synchronization signal generated with the beamforming weight in downlink.

7 Claims, 15 Drawing Sheets

(56) References Cited

U.S. PATENT DOCUMENTS

| | | | |
|---|---|---|---|
| 9,680,552 B2* | 6/2017 | Ko | H04B 7/0634 |
| 2013/0064239 A1* | 3/2013 | Yu | H04W 72/046 |
| | | | 370/350 |
| 2013/0083774 A1 | 4/2013 | Son et al. | |
| 2014/0073337 A1* | 3/2014 | Hong | H04W 16/28 |
| | | | 455/452.1 |
| 2014/0177607 A1* | 6/2014 | Li | H04W 74/0833 |
| | | | 370/336 |
| 2014/0211731 A1 | 7/2014 | Inoue et al. | |
| 2016/0087349 A1* | 3/2016 | Lee | H01Q 1/246 |
| | | | 342/373 |

OTHER PUBLICATIONS

Written Opinion of the International Searching Authority issued in PCT/JP2014/071632 dated Nov. 25, 2014 (5 pages).
Samsung; "Inter-Cell Interference Mitigation Through Limited Coordination"; 3GPP TSG RAN WG1 #54, R1-082886; Jeju, Korea; Aug. 18-22, 2008 (9 pages).
3GPP TR 25.913 V9.0.0; "3rd Generation Partnership Project; Technical Specification Group Radio Access Network; Requirements for Evolved UTRA (E-UTRA); and Evolved UTRAN (E-UTRAN) (Release 9)"; Dec. 2009 (18 pages).
Office Action issued in corresponding Japanese Application No. 2013-170814, dated Oct. 3, 2017 (10 pages).

\* cited by examiner

Step-1

Step-2

Step-n

SYNCHRONIZATION SIGNAL TRANSMITTING METHOD AND BASE STATION APPARATUS

TECHNICAL FIELD

The present invention relates to a synchronization signal transmitting method and a base station apparatus in next-generation mobile communication systems.

BACKGROUND ART

In a UMTS (Universal Mobile Telecommunications System) network, for the purposes of further increasing data rates, providing low delay and so on, long-term evolution (LTE) has been studied (see Non Patent Literature 1). Besides, for the purposes of achieving further broadbandization and higher speed, successor systems to LTE have been also studied (for example, such a system is also called "LTE advanced" or "LTE enhancement" (hereinafter referred to as "LTE-A")).

In these LTE or LTE-A systems, when a mobile station apparatus UE performs communication with network, cell search processing needs to be performed to establish synchronization. In the cell search processing, the mobile station apparatus UE detects a synchronization signal (SS), which is transmitted from the base station apparatus at constant time intervals, to obtain frequency synchronization of a cell (serving cell) where the mobile station apparatus UE is located, timing synchronization and cell ID (PCI: Physical Cell ID). The mobile station apparatus UE uses this obtained information as a basis to fix the serving cell. Then, the mobile station apparatus UE transmits a RACH (Random Access CHannel) to notify the cell of existence of the mobile station apparatus and reserve communication resources.

CITATION LIST

Non Patent Literature

Non-Patent Literature 1: 3GPP, TS25.913 "Requirements for Evolved UTRA and Evolved UTRAN"

SUMMARY OF INVENTION

Technical Problem

Here, in LTE-A and latter mobile communication systems, for example, there has been studied application of MIMO using many small antenna elements in high-frequency band (Massive MIMO (Multi Input Multi Output), hereinafter referred to as "Massive-MIMO"). This use of massive antenna elements like in Massive MIMO enables higher-level beamforming.

Beamforming is a technique of controlling the amplitude and phase of each transmission/reception signal in multiple antenna elements thereby to change the directivity and beam shape of each transmission/reception beam. In this beamforming, as the number of antenna elements is greater, higher-level control is enabled. In other words, the number of beams, the shape of each beam (the beam width in the horizontal plane, the beam width in the vertical plane, and so on, hereinafter referred to as "beam width"), direction and gain of each beam are all able to be controlled in detail in accordance with the number of antenna elements. For example, if the beam width is narrowed (a narrow beam is formed), it is possible to achieve high gain (power density).

In order to make full use of the performance of such a Massive-MIMO applied communication system, it is necessary to transmit synchronization signals to a mobile station apparatus UE reliably and to perform the cell search processing appropriately in the mobile station apparatus UE. However, with the currently-used configuration, the cell search processing seems sometimes difficult to perform at the mobile station apparatus UE side, thereby preventing full use of the communication system performance.

The present invention was carried out in view of the foregoing and aims to provide a synchronization signal transmitting method and a base station apparatus capable of making full use of the performance of a Massive-MIMO applied communication system.

Solution to Problem

The present invention provides a synchronization signal transmitting method of controlling a transmission direction of a transmission beam for a synchronization signal used in cell search by beamforming using a plurality of antenna elements provided in a base station apparatus, the synchronization signal transmitting method comprising: a synchronization signal processing step of generating the synchronization signal including information to identify the transmission beam for the synchronization signal and changing a beamforming weight for the synchronization signal at every given time interval; and a transmission step of transmitting the synchronization signal generated with the beamforming weight in downlink.

The present invention further provides a base station apparatus for controlling a transmission direction of a transmission beam for a synchronization signal used in cell search by beamforming using a plurality of antenna elements, the base station apparatus comprising: a synchronization signal processing section that generates the synchronization signal including information to identify the transmission beam for the synchronization signal and changes a beamforming weight for the synchronization signal at every given time interval; and a transmission section that transmits the synchronization signal generated with the beamforming weight in down

Advantageous Effects of Invention

According to the present invention, the synchronization signal transmitting method and base station apparatus are provided thereby to be able to make full use of the performance of the Massive-MIMO applied communication system.

DESCRIPTION OF EMBODIMENTS

With reference to the accompanying drawings, embodiments of the present invention will be described in detail below.

First description is made about the summary of the Massive-MIMO transmission scheme that is applied to a base station apparatus according to the present embodiment. In the Massive-MIMO transmission scheme, for example, 100 or more antenna elements are used to transmit data thereby to improve the data rate (frequency spectrum efficiency). Since 100 or more antenna elements are used to transmit data, it is possible to improve the transmission efficiency associated with multiplexing as compared with the case of using fewer antenna elements and also possible to enable higher-speed radio communication than the conventional case. In addition, there is a wide variety of choices for combination of antenna elements in beamforming, which also enables higher-level beamforming than the conventional case. This higher-level beamforming brings about the effects of increase of reception signal power due to beamforming gains and reduction in interference as well as effective use of radio resources.

Further, in the Massive-MIMO transmission scheme, for example, it is possible to use 10 GHz or higher frequency band preferably. Generally, the size of each antenna element is proportional to the wavelength of a transmission signal. In the high frequency band, the wavelength of a transmission signal is relatively short and each antenna element can be downsized. This is preferable for the Massive-MIMO transmission scheme having a large number of antenna elements. In addition, in the high frequency band, the use efficiency is lower than that in the low frequency band and a wide-band resource can be easily obtained. On the other hand, in transmission of high frequency band signals, there is increase in propagation loss. Accordingly, if high-frequency-band signal transmission is conducted with the same transmission power as low-frequency-band signal transmission, the reception signal strength in the mobile station apparatus UE may be lowered in the high-frequency-band signal transmission. However, such reduction of reception signal strength can be compensated by the beamforming gain.

Figure 1B:
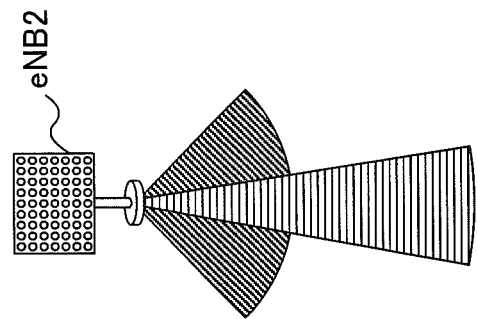
FIG. 1 provides explanatory diagrams each for explaining the reach of a transmission beam in a base station apparatus to which Massive-MIMO is applied.
Figure 1A:
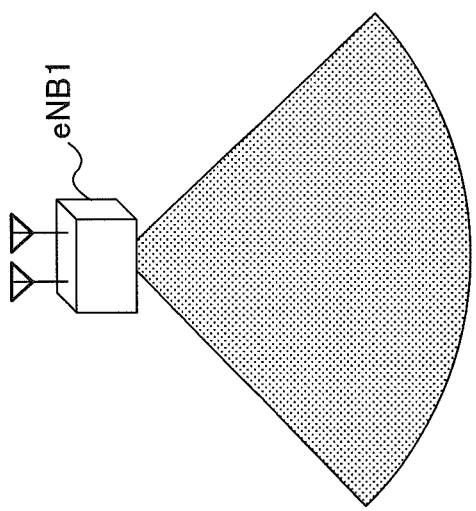

Here, description is made about the reach of transmission beams in the base station apparatus to which the Massive-MIMO transmission scheme is applied (herein after referred to as "Massive-MIMO base station"). FIG. 1 provides diagrams for explaining the reach of a transmission beam in the Massive-MIMO base station. FIG. 1A illustrates the reach of a transmission beam that is output from a normal base station apparatus (base station apparatus to which Massive-MIMO is not applied), and FIG. 1B illustrates the reach of a transmission beam that is output from the Massive-MIMO base station. The Massive-MIMO base station illustrated in FIG. 1B performs signal transmission using the high frequency band and the base station illustrated in FIG. 1A performs signal transmission using the low frequency band.

Since the normal base station eNB1 illustrated in FIG. 1A performs signal transmission using the low frequency band, even when a transmission beam has a wide width (transmission beam with a wide coverage is formed), the reach distance of the transmission beam is long. On the other hand, for the case of the Massive-MIMO base station eNB2 illustrated in FIG. 1B, when a wide transmission beam is formed, the reach distance of the transmission beam cannot be long due to the propagation characteristic of the high frequency band. On the other hand, when a narrow transmission beam is formed (transmission beam with a narrow coverage (localized range) is formed) by beamforming, the reach distance of the transmission beam can be long. Considering this, for the Massive-MIMO base station, it is preferable to first know the location (direction and distance) of a mobile station apparatus UE as a transmission target in advance, form a transmission beam with the directivity corresponding to the location of the mobile station apparatus UE and transmit user data.

In radio communication with this Massive-MIMO base station, like in LTE and LTE-A, the mobile station apparatus UE needs to perform cell search for synchronization establishment. However, if a synchronization signal (SS) is transmitted from the Massive-MIMO base station without beamforming and the mobile station apparatus UE is located far away from the Massive-MIMO base station, the reception power of the synchronization signal is lowered so that the mobile station apparatus UE is not able to perform the cell search processing properly.

In the Massive-MIMO applied communication system, there is difference in reach distance between the beamformed user data and the not-beamformed SS. Therefore, it depends on the distance of the mobile station apparatus UE from the Massive-MIMO base station whether the mobile station apparatus UE is able to perform cell search processing or not. The present inventors have noted this problem of cell search processing associated with the background which may cause reduction in throughput performance of the system as a whole and have arrived at the present invention.

That is, the gist of the present invention is a synchronization signal transmitting method of controlling a transmission direction of a transmission beam for a synchronization signal used in cell search by beamforming using a plurality of antenna elements provided in the Massive-MIMO base station, in which the synchronization signal is generated including information to identify the transmission beam for the synchronization signal and a beamforming weight for the synchronization signal is changed at every given time interval, and the synchronization signal generated with the beamforming weight is transmitted in downlink.

According to the present invention, since a synchronization signal is generated and transmitted with a beamforming weight that is changed for every given time interval, it is possible to make the synchronization signal arrive at a long-distance location from the Massive-MIMO base station. With this structure, the mobile station apparatus UE is able to perform the cell search processing properly, it is possible to prevent reduction of the throughput performance due to problems of the cell search processing. Particularly, according to the present invention, as each synchronization signal includes information to identify a transmission beam for the synchronization signal, it is possible to identify the transmission beam for the synchronization signal at the mobile station apparatus UE and even when beamforming is applied to the synchronization signal, it is possible to perform the cell search processing properly.

Figure 2:
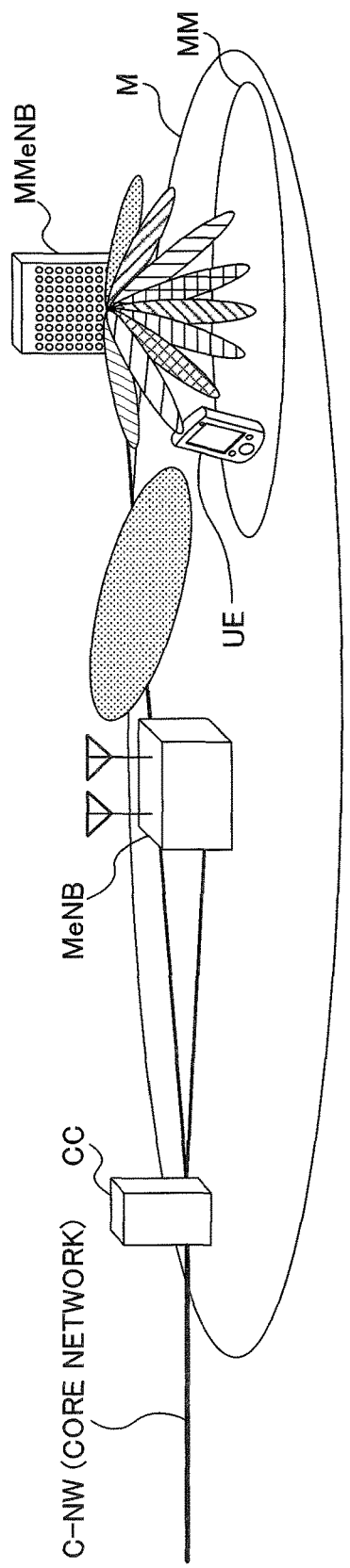
FIG. 2 is a diagram illustrating an example of the network configuration to which the base station according to an embodiment is applied.

Next description is made about the network configuration to which the base station apparatus according to the present embodiment (Massive-MIMO base station). FIG. 2 is a diagram illustrating an example of the network configuration to which the base station apparatus according to the present embodiment is applied. In FIG. 2, the base station apparatus according to the present embodiment is applied to the network configuration in which the Massive-MIMO cell MM is overlaid in the cell area of the macro cell (for example, Heterogeneous Network). However, the network to which the Massive-MIMO base station according to the present embodiment is applied is not limited to this overlaying network, and may be modified appropriately.

In the network configuration illustrated in FIG. 2 in which the Massive-MIMO cell MM is overlaid (hereinafter referred to as "overlaying network"), the base station apparatus forming the macro cell M (hereinafter referred to as "macro base station") MeNB and the base station apparatus forming the Massive-MIMO cell MM (hereinafter referred to as "Massive-MIMO base station (MM base station), appropriately) MMeNB are connected to a central control station CC that is located in the macro cell. This central control station is connected to the core network (not shown). The central control station CC includes, but is not limited to, for example, access gateway apparatus, radio network controller (RNC), mobility management entity (MME) and so on.

The mobile station apparatus (hereinafter referred simply as "mobile station") UE is configured to be able to communicate with the macro base station MeNB if it is located within the macro cell M, and the mobile station apparatus UE is configured to be able to communicate with the MM base station MMeNB as well as the macro base station MeNB if it is located within the Massive-MIMO cell MM. Here, for convenience of explanation, it is assumed that the mobile station UE performs radio communication with the macro base station MeNB and the MM base station MMeNB, however, more generally, the mobile station UE may be a user apparatus (UE: User Equipment) including a mobile terminal apparatus and a fixed or stationary terminal apparatus.

In the overlaying network configuration illustrated in FIG. 2, for example, the control plane (C-plane) to handle control messages is supported by the macro cell M. On the other hand, the user plane (U-plane) to handle user data is supported by the Massive-MIMO cell MM. In addition, in the overlaying network configuration illustrated in FIG. 2, the macro cell M and the Massive-MIMO cell MM operate over different frequency bands. For example, it is assumed that the C-plane supported by the macro cell M is 2 GHz band and the U-plane supported by the Massive-MIMO cell MM is 10 GHz band.

For example, when the Massive-MIMO cell MM is operated over the 10 GHz band, connection between the MM base station MMeNB and the mobile station UE often uses line of sight (LoS) where there is no obstacle. In this LoS communication environment, there is generally formed a propagation path of less frequency selectivity.

In the overlaying network configuration illustrated in FIG. 2, the MM base station MMeNB according to the present embodiment is located overlapping the macro cell M. However, the object overlapped by the MM base station MMeNB according to the present embodiment is not limited to this. For example, the MM base station MMeNB may be located overlapping a wireless Local Area Network (LAN) or wired LAN like the macro cell M. Further, the MM base station MMeNB according to the present embodiment does not always have to be located over another radio base station or network.

In the overlaying network configuration illustrated in FIG. 2, the MM base station MMeNB is able to transmit signals using the Massive-MIMO transmission scheme to a mobile station UE located within the Massive-MIMO cell MM. More specifically, the MM base station MMeNB is able to perform signal transmission by controlling, in each antenna element, the amplitude and phase of each signal and forming a transmission beam with directivity toward the mobile station UE.

Here, in the communication environment where C-plane and U-plane are supported in a different manner between the macro cell M and the Massive-MIMO cell MM, like in the overlaying network illustrated in FIG. 2, for example, the macro base station MeNB transmits control information required for reception of user data to the mobile station UE and the MM base station MMeNB transmits user data to the mobile station UE. It may be further configured that the macro base station MeNB transmits a part of control information and the MM base station MMeNB transmits a remaining part of the control information and user data.

The MM base station MMeNB according to the present embodiment applies beamforming not only to user data for the mobile station UE but also to synchronization signals (hereinafter referred to as "SS signal") required for cell search processing. More specifically, the MM base station MMeNB applies beamforming to an SS signal and generates a transmission beam of small beam width to transmit. In the following description, an SS signal to which beamforming is applied is called "BF-SS signal". Thus, as the synchronization signal is also subjected to beamforming thereby to form a transmission beam having a directivity toward a given range within the Massive-MIMO cell MM service area (hereinafter referred to as "SA"), it is possible to prevent reduction of reception power in the synchronization signal. Even when the mobile station UE is located at the position far away from the MM base station MMeNB, the mobile station UE is able to detect the synchronization signal and to perform the cell search processing.

The following description is made about several embodiments of the method of transmitting a synchronization signal (BF-SS signal) in the MM base station MMeNB according to the present embodiment.

First Embodiment

Figure 3A:
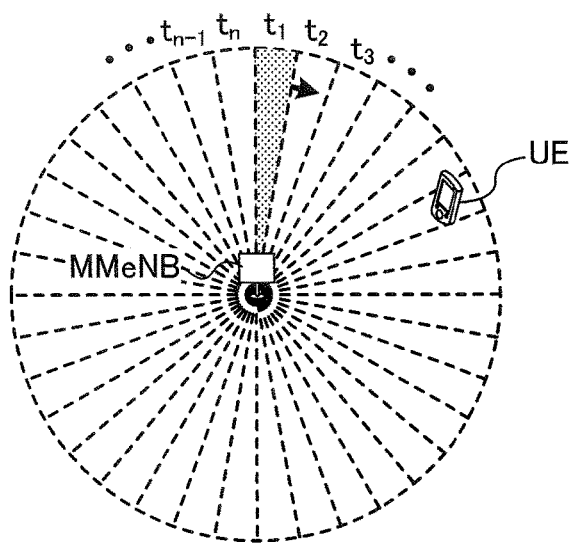
FIG. 3 provides explanatory diagrams for explaining the method of transmitting a BF-SS signal according to a first embodiment.
Figure 3B:
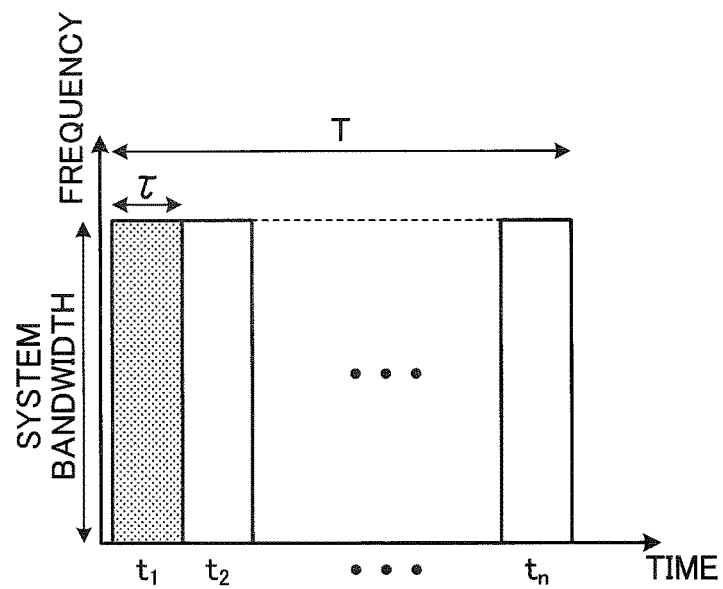

First description is made about the method of transmitting a BF-SS signal according to the first embodiment. FIG. 3 provides explanatory diagrams of the method of transmitting a BF-SS signal according to the first embodiment. FIG. 3A schematically illustrates the image of transmitting a BF-SS signal from the MM base station MMeNB to SA. In FIG. 3B, BF-SS signal beams transmitted from the MM base station MMeNB are mapped over the time axis and frequency axis.

In the method of transmitting a BF-SS signal according to the first embodiment, as illustrated in FIG. 3, a transmission beam of small beam width (hereinafter also referred to as "narrow beam") is generated for transmission of a BF-SS signal. Then, the transmission direction of this narrow beam is changed in the azimuthal angle direction for every time interval $\tau$, and the BF-SS signal is transmitted to whole the SA of the Massive-MIMO cell MM over a predetermined total time T. That is, the method of transmitting a BF-SS signal according to the first embodiment is the transmission method in which the transmission direction of a narrow beam for transmission of the BF-SS signal is changed in the azimuthal angle direction for every time interval $\tau$ thereby to scan all mobile stations UE located within SA of the Massive-MIMO cell MM.

For example, according to the method of transmitting a BF-SS signal according to the first embodiment, a narrow beam is transmitted in a certain direction in the Massive-MIMO cell MM at timing $t_1$, and then, a narrow beam is transmitted in the transmission direction that is shifted in the azimuthal angle direction by the beam width $\phi$ at timing $t_2$ (see FIG. 3A). Likewise, transmission of a narrow beam is repeated by shifting the transmission direction in the azimuthal angle direction by the beam width $\phi$ for every time interval $\tau$. At timing $t_n$, a narrow beam is transmitted in the direction next to the direction of the narrow beam at timing $t_1$, and thereby, it is possible to scan whole the SA (in all directions) of the Massive-MIMO cell MM. Here, the BF-SS signal that is transmitted for every time interval $\tau$ is able to be transmitted using the bandwidth of whole the communication system (see FIG. 3B).

In the method of transmitting a BF-SS signal according to the first embodiment, the BF-SS signal S(t) is, for example, obtained by the following (Equation 1).

$$S(t)=W_n(t,f)\cdot S_{ss}(t) \quad \text{(Equation 1)}$$

where $W_n(t, f)$ is a beamforming weight (hereinafter referred to as "BF weight"), and $S_{ss}(t)$ denotes a SS signal.

Besides, in the method of transmitting a BF-SS signal according to the first embodiment, the total time T for transmitting the BF-SS signal to whole of the SA (in all directions) of the Massive-MIMO cell MM is, for example, obtained by the following (Equation 2).

$$T=360\tau/\Phi \quad \text{(Equation 2)}$$

where $\tau$ is a time interval of the BBF-SS signal, and $\Phi$ is the beam width of the BF-SS signal.

Here, in the method of transmitting a BF-SS signal according to the first embodiment, the time interval $\tau$ and the beam width $\Phi$ are configured to be selectable as parameters in the communication system. For example, the time interval $\tau$ may be determined in accordance with the signal length of the SS signal. When the signal length of the SS signal can be made longer, the time interval $\tau$ is increased, while when the signal length of the SS signal is short, the time interval $\tau$ can be made smaller. Further, the beam width $\Phi$ is determined in accordance with the number of antenna elements, transmission power, frequency band, bandwidth and total time T. When the number of antenna elements is large, the beam width $\Phi$ can be made small, while when the number of antenna elements is small, the beam width $\Phi$ can be made larger. When transmission power is large, the beam width $\Phi$ can be made larger, while when the transmission power is small, the beam width $\Phi$ can be made smaller. When the frequency band is high, the beam width $\Phi$ can be made smaller, while when the frequency band is low, the beam width $\Phi$ can be made larger. When the bandwidth is wide, the beam width $\Phi$ can be made smaller, while when the bandwidth is narrow, the beam width $\Phi$ can be made larger. When the total time T is long, the beam width $\Phi$ can be made smaller, while when the total time T is short, the beam width $\Phi$ can be made larger. When the cell radius is large, the beam width $\Phi$ can be made smaller, while when the cell radius is small, the beam width $\Phi$ can be made larger.

Further, the time interval $\tau$ and the beam width $\Phi$ may be determined in accordance with predetermined values. Further, the time interval $\tau$ and the beam width $\Phi$ may be calculated adaptively in accordance with the communication environment. The communication environment may include the number of mobile stations UE within the Massive-MIMO cell MM, a distance to a neighbor cell (Massive-MIMO cell MM) and so on. Here, the information about this communication environment may be obtained, for example, from the macro cell M (more specifically, the macro base station MeNB) overlapped by the Massive-MIMO cell MM.

Further, in the method of transmitting a BF-SS signal according to the first embodiment, each BF-SS signal is configured to be identified by the mobile station UE. For example, a narrow beam to be transmitted in each direction may be assigned with unique identification information (beam ID). For example, this beam ID is generated by the MM base station MMeNB and is included in a synchronization signal together with the system information such as cell ID. Since it is included in the synchronization signal, once the mobile station UE receives the synchronization signal, the mobile station UE is able to receive the beam ID together with the system information properly. Generally, the cell ID is preferably a cell-specific orthogonal sequence for identifying the base station.

In the following description, for convenience of explanation, a narrow beam transmitted in each direction is allocated with a unique beam ID, however, this identification information is not limited to the beam ID. As far as the information enables identification of a narrow beam transmitted in each direction, the information may be any identification information. For example, it may be configured that like PSS (Primary Synchronization Signal) and SSS Secondary Synchronization Signal) in LTE, plural-type SS signals are prepared in advance and they are assigned with different system information pieces. Or, the BF weight in the above-mentioned (Equation 1) may be used as identification information.

Thus, according to the method of transmitting a BF-SS signal according to the first embodiment, as the synchronization signal (BF-SS signal) is generated and transmitted with a beamforming weight that changes for every time interval τ, it is possible to make the synchronization signal reach the position far away from the Massive-MIMO base station MMeNB. With this structure, it is possible to allow the mobile station UE to perform the cell search processing properly and also possible to prevent reduction in throughput performance due to problems in the cell search processing.

Particularly, according the method of transmitting a BF-SS signal according to the first embodiment, as each synchronization signal includes a beam ID to identify a transmission beam for the synchronization signal, it is possible to identify the transmission beam for the synchronization signal at the mobile station UE. With this structure, even when beamforming is applied to a synchronization signal, it is possible to perform the cell search processing properly.

Here, regarding generation of a synchronization signal (BF-SS signal) in the method for transmitting a BF-SS signal according to the first embodiment, it is also preferable that BF weights corresponding to various beam directions and beam shapes (widths) are generated in advance and stored in the Massive-MIMO base station MMeNB (or in the network) as storage information in the database, and then, at the time of beamforming, a BF weight is only selected in accordance with beam direction and width. In this case, as the process of generating a BF weight based on the beam direction and width is omitted, it is possible to reduce load in generating a synchronization signal (BF-SS signal) in the Massive-MIMO base station MMeNB.

Second Embodiment

Next description is made about the method of transmitting a BF-SS signal according to a second embodiment. The method of transmitting a BF-SS signal according to the second embodiment is different from the method of transmitting a BF-SS signal according to the first embodiment in that an elevation angle is added to the transmission direction of a narrow beam for transmission of the BF-SS signal. In other words, in the method for transmitting a BF-SS signal according to the second embodiment, the transmission direction of a narrow beam for transmission of the BF-SS signal is changed in the azimuthal angle direction and in the elevation angle direction for every time interval τ thereby to scan all mobile stations UE within SA of the Massive-MIMO cell MM. In the following description, this difference from the method of transmitting a BF-SS signal according to the first embodiment is explained mainly. In this description, the elevation angle direction is defined as the direction that is orthogonal to the horizontal direction, and the elevation angle 0° denotes the downward (or upward) direction and the elevation angle 90° denotes the horizontal direction.

Figure 4A:
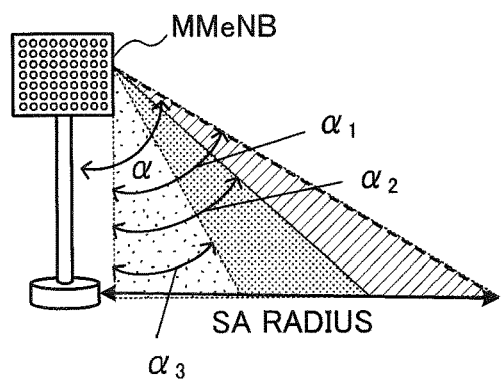
FIG. 4 provides explanatory diagrams for explaining the method of transmitting a BF-SS signal according to a second embodiment.
Figure 4B:
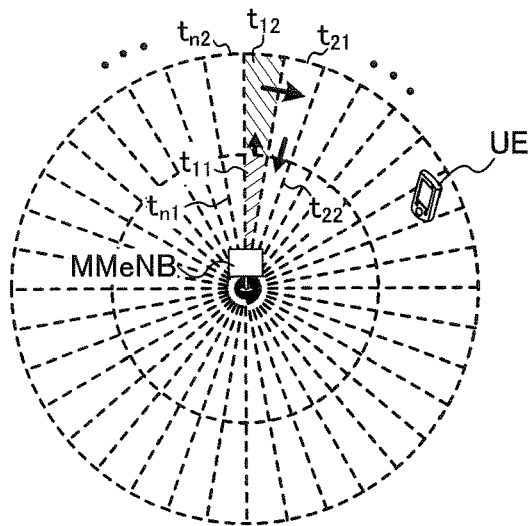
Figure 4C:
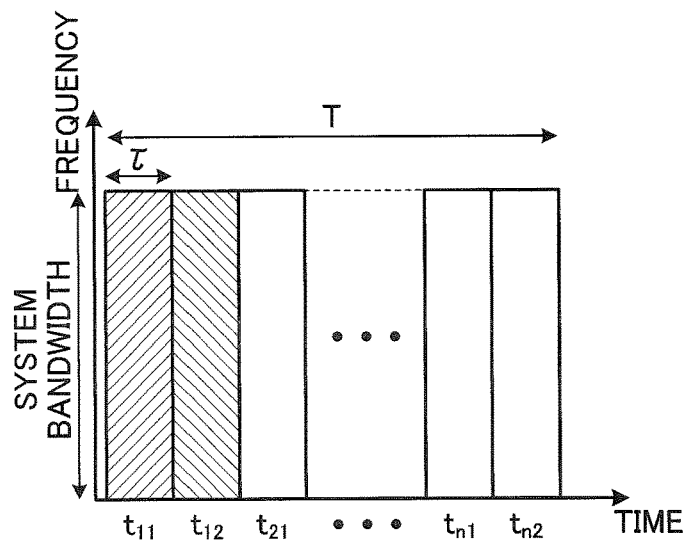

FIG. 4 provides explanatory diagrams of the method of transmitting a BF-SS signal according to the second embodiment. FIG. 4A is a diagram for explaining the elevation angle of a BF-SS signal transmitted from the MM base station MMeNB, and FIG. 4B schematically illustrates the image of transmitting a BF-SS signal from the MM base station MMeNB to SA. In FIG. 4C, BF-SS signal beams transmitted from MM base station MMeNB are mapped on the time and frequency axes.

In the method of transmitting a BF-SS signal according to the second embodiment, the MM base station MMeNB is assumed to be located at the position far away from the ground. For example, the MM base station MMeNB used in the method of transmitting a BF-SS signal according to the second embodiment is, as illustrated in FIG. 4A, located at the position such that a transmission beam forms an elevation angle α along the radius of SA of the Massive-MIMO cell MM. For example, the MM base station MMeNB used in the method of transmitting a BF-SS signal according to the second embodiment is, as illustrated in FIG. 4A, configured to transmit a BF-SS signal toward three areas included in SA of the Massive-MIMO cell MM by generating a transmission beam having an angle $α_1$ in the elevation angle direction, a transmission beam having an angle $α_2$ in the elevation angle direction and a transmission beam having an angle $α_3$ in the elevation angle direction.

In the method of transmitting a BF-SS signal according to the second embodiment, as illustrated in FIGS. 4B and 4C, it is different from the method of transmitting a BF-SS signal according to the first embodiment in that different transmission beams are generated in the radius direction of the Massive-MIMO cell MM. Here, generation of different transmission beams in the radius direction of the Massive-MIMO cell MM is, for example, performed by the beamforming (3D beamforming) technique that gives a directivity in the vertical direction.

In FIGS. 4B and 4C, for convenience of explanation, the beam width φ of a transmission beam in the radius direction of the Massive-MIMO cell MM corresponds to a half of the length of the radius of the Massive-MIMO cell MM. That is, in FIGS. 4B and 4C, description is made about generation of two different transmission beams in the radius direction of the Massive-MIMO cell MM. However, the number of transmission beams that are generated in the radius direction of the Massive-MIMO cell MM is not limited to this, but may be modified appropriately.

For example, in the method of transmitting a BF-SS signal according to the second embodiment, at timing $t_{11}$, a narrow beam is transmitted in a certain direction inside the Massive-MIMO cell MM and then, at timing $t_{12}$, a narrow beam is transmitted in the direction that is shifted outward (increased elevation angle direction) by the beam width φ (see FIG. 4B). At timing $t_{21}$, a narrow beam is transmitted in the direction that is shifted by the beam width φ in the azimuthal angle direction, and then, at timing $t_{22}$, a narrow beam is transmitted in the direction that is shifted inward (decreased elevation angle direction) by the beam width φ (see FIG. 4B). Likewise, transmission of a narrow beam is repeated by shifting the transmission direction in elevation angle direction or in the azimuthal angle direction by the beam width φ for every time interval τ. Since a narrow beam is transmitted at timing $t_{n1}$, $t_{n2}$ in the direction adjacent to the direction of a narrow beam transmitted at timing $t_{11}$, $t_{12}$, it is possible to scan whole of the SA of the Massive-MIMO cell MM (in all directions).

In the method of transmitting a BF-SS signal according to the second embodiment, a BF-SS signal S(t) is obtained, for example, by the above-mentioned (Equation 1). On the other hand, in the method of transmitting a BF-SS signal according to the second embodiment, a total time T required for transmitting the BF-SS signal to whole of the SA in the Massive-MIMO cell MM (in all directions) is obtained, for example, by the following (Equation 3).

$$T = 360ατ/Φ^2 \quad \text{(Equation 3)}$$

where
τ denotes a time interval for transmission of a BF-SS signal,
α denotes an angle in the maximum elevation angle direction of a transmission beam, and Φ denotes a beam width of the BF-SS signal.

In the method of transmitting a BF-SS signal according to the second embodiment, the time interval τ and the beam width Φ are configured to be selectable as parameters in the communication system, like in the first embodiment. In addition, like in the first embodiment, the time interval τ and the beam width Φ may be determined depending on a predetermined content or may be calculated adaptively in accordance with a communication environment.

In this description, it is assumed that the beam width in the horizontal plane (horizontal beam width) and the beam width in the vertical plane (vertical beam width) are both identical to the beam width Φ, however, the horizontal beam width and the vertical beam width may be set to different values. In such a case, the total time T required for transmitting the BF-SS signal to whole of the SA of the Massive-MIMO cell MM (in all directions) can be obtained, for example, by the following (Equation 4).

$$T=360\alpha\tau/(\Phi_H \Phi_V) \quad \text{(Equation 4)}$$

where

τ denotes a time interval for transmission of a BF-SS signal, α denotes an angle in the maximum elevation angle direction of a transmission beam, $\Phi_H$ denotes a horizontal beam width of the BF-SS signal, and $\Phi_V$ denotes a vertical beam width of the BF-SS signal.

When the transmission direction of the beam is changed in the elevation angle direction, there may occur a situation that same-width beams have different irradiation ranges (areas) depending on the elevation angle of the beam. In other words, when the elevation angle is higher (the angle α is greater), the irradiation area becomes large (see the angle $\alpha_1$ in FIG. 4A), while when the elevation angle is lower (the angle α is smaller), the irradiation area becomes small (see the angle $\alpha_3$ in FIG. 4A). In association with the size of the irradiation area, the power density becomes lower in the former case and the power density becomes higher in the latter case. In the method of transmitting a BF-SS signal according to the second embodiment, it is preferable to consider the above-mentioned situation, uniformity of scanning of the BF-SS signal in SA, and efficiency when selecting parameters including the beam width, time interval and so on. In this case, for example, if the beam width and time interval are adjusted in accordance with the elevation angle, it is possible to achieve commonality of beam total power and uniformity in BF-SS signal scanning.

The scanning order and range of the transmission beams may be also configured to be selectable as parameters in the communication system. For example, FIG. 4B shows when the transmission direction of a transmission beam is changed in the azimuthal angle direction, scanning starts at the same side in the radial direction of the Massive-MIMO cell MM. For example, when the transmission direction of the transmission beam is changed in the azimuthal angle direction, if a transmission beam before change is arranged at the outer side of the Massive-MIMO cell MM, a next transmission beam is transmitted to the outer side that is the same direction. However, the scanning order of transmission beams is not limited to this, and may be modified appropriately. For example, when the transmission direction of the transmission beam is changed in the azimuthal angle direction, scanning in the radial direction of the Massive-MIMO cell MM may start at different sides. For example, when the transmission direction of the transmission beam is changed in the azimuthal angle direction, even if a transmission beam before change is arranged at the outer side of the Massive-MIMO cell MM, the transmission beam may be transmitted to the inner side contrary to the previous transmission beam.

Further, in FIG. 4B, it is assumed that the scanning range is whole of the SA of the Massive-MIMO cell. However, the scanning range of transmission beams is not limited to this, and may be modified appropriately. For example, the scanning range of transmission beams may be restricted to a part of the area of the Massive-MIMO cell MM. Such selection of a local scanning area is expected when the location of the mobile station UE is obtained in advance from the overlapping macro cell M (more preferably, from the macro base station MeNB).

Thus, according to the method of transmitting a BF-SS signal of the second embodiment, like in the method of transmitting a BF-SS signal according to the first embodiment, a synchronization signal (BF-SS signal) is generated and transmitted with a beamforming weight that varies for every time interval τ, the synchronization signal is able to reach at the position far away from the Massive-MIMO base station MMeNB. With this structure, the mobile station UE is able to perform the cell search processing properly, thereby preventing reduction in throughput performance due to problems in the cell search processing. Further, as each synchronization signal includes a beam ID to identify a transmission beam for the synchronization signal, the mobile station UE is able to identify the transmission beam for the synchronization signal, and even if the synchronization signal is subjected to beamforming, the cell search processing is allowed to be performed properly.

In the description made up to this point, the transmission direction is changed only in the azimuthal angle direction in the method of transmitting a BF-SS signal according to the first embodiment, while the transmission direction is changed in the azimuthal angle direction and in the elevation angle direction in the method of transmitting a BF-SS signal according to the second embodiment. However, these methods of transmitting a BF-SS signal according to the first and second embodiments may be used in combination. Here, for convenience of explanation, the scanning mode in the method of transmitting a BF-SS signal according to the first embodiment is called two-dimensional scanning mode (2D scanning mode) and the scanning mode in the method of transmitting a BF-SS signal according to the second embodiment is called three-dimensional scanning mode (3D scanning mode).

These scanning modes are configured to be selectable as a parameter in the communication system. For example, it may be configured that when SA of the Massive-MIMO cell MM is relatively large, the 3D scanning mode is selected, and when SA of the Massive-MIMO cell MM is relatively small, the 2D scanning mode is selected. Otherwise, it may be also configured that if SA can be covered by a beam of wide beam width in the vertical plane, the 2D scanning mode is selected. Further, it may be also configured that if the location of the mobile station UE is obtained in advance from the overlapping macro cell M (more specifically, the macro base station MeNB), the 2D scanning mode and the 3D scanning mode may be switched in accordance with the communication environment including the location of the mobile station UE and so on.

For example, these scanning modes are changed by selecting a BF weight for controlling the transmission direction of a BF-SS signal in the azimuthal angle direction or a BF weight for controlling the transmission direction of a BF-SS signal in the azimuthal angle direction and the elevation angle direction. By this selection of a BF weight, the 2D scanning mode and the 3D scanning mode are switched thereby to be able to change a synchronization signal required for the cell search processing flexibly while avoiding the necessity for any complicated control.

Figure 5:
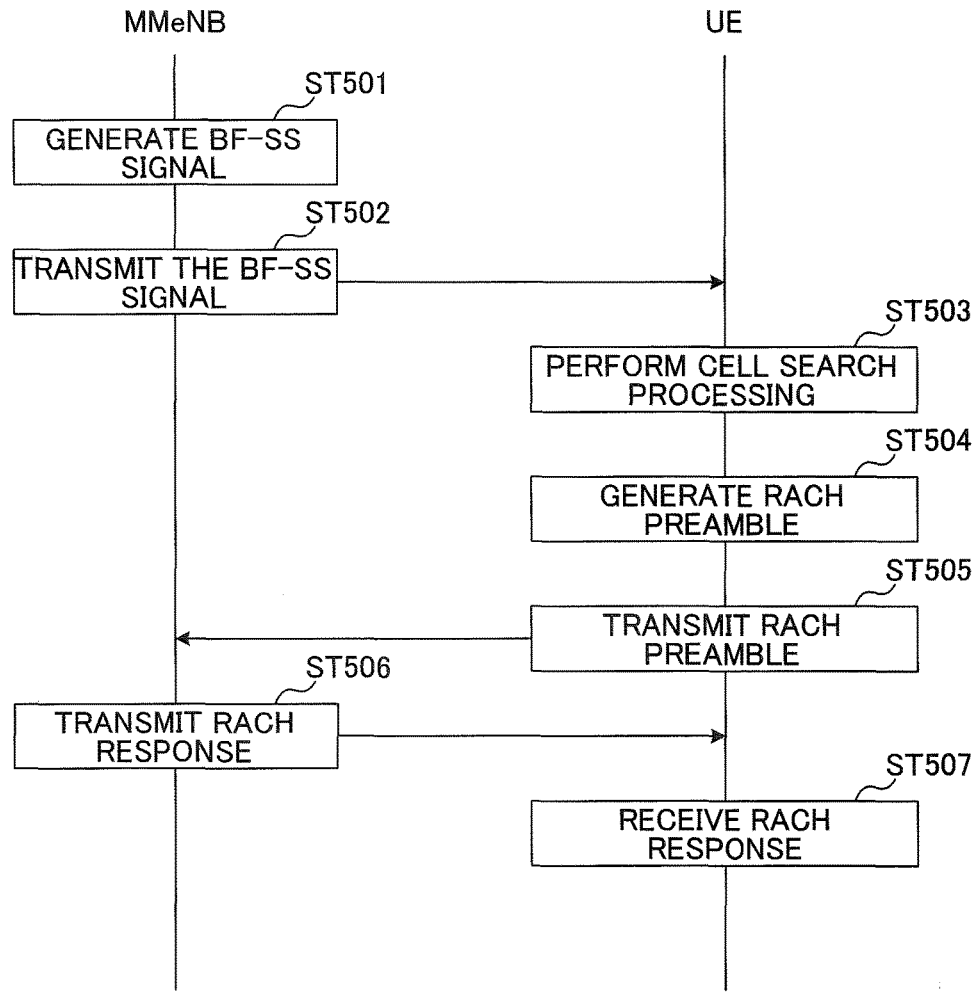
FIG. 5 is a diagram for explaining the operational sequence between the Massive-MIMO base station and a mobile station in the method of transmitting a BF-SS signal according to the first and second embodiments.

Next description is made about the outline of the operational sequence between the MM base station MMeNB and the mobile station UE in the methods of transmitting a BF-SS signal according to the first and second embodiments. FIG. 5 is an explanatory view of an example of the operational sequence between the MM base station MMeNB and the mobile station UE in the methods of transmitting a BF-SS signal according to the first and second embodiments. In FIG. 5, it is assumed that a synchronization signal (BF-SS signal) transmitted from the MM base station MMeNB includes a beam ID as identification information for a transmission beam.

As illustrated in FIG. 5, first, the MM base station MMeNB applies beamforming to an SS signal (multiples it by a BF weight) to generate a BF-SS signal (Step (hereinafter referred to as "ST") 501). For example, the MM base station MMeNB generates the BF-SS signal by calculation of the abovementioned (Equation 1). Then, the MM base station MMeNB transmits the generated BF-SS signal (ST 502). This BF-SS signal is transmitted toward a given area of the Massive-MIMO cell MM designated by the BF weight. This BF-SS signal includes a cell ID, a beam ID and so on.

In the mobile station UE, the cell search processing is performed at the time of switch on, at the time of return from the outside to the inside of the cell (small cell), or the like (ST 503). In this cell search processing, the mobile station UE monitors the BF-SS signal from the MM base station MMeNB. When receiving the BF-SS signal, the mobile station UE specifies the frequency from this BF-SS signal and achieves the timing synchronization. In addition, the mobile station UE obtains the cell ID, the beam ID, reception quality information of the BF-SS signal (for example, reception power information) and so on. Once the mobile station UE obtains them, the cell search processing is completed.

In the cell search processing, when receiving a plurality of transmission beams (BF-SS signal), for example, the mobile station UE obtains beam IDs and reception quality of all the received beams, and so on. Here, the mobile station UE may be configured to obtain beam IDs and reception quality of M transmission beams (BF-SS signal) of best reception quality, beam IDs and reception quality of transmission beams (BF-SS signal) of predetermined reception quality or better. In such a case, the number of transmission beams (M beams) or a threshold of the reception quality may be configured to be selectable as parameters in the communication system.

After completion of the cell search processing, the mobile station UE generates a RACH preamble based on the cell ID and beam ID obtained in the cell search processing and its terminal ID (UE-ID) (ST 504). Then, the mobile station UE transmits the generated RACH preamble together with reception quality information of the transmission beam (BF-SS signal) and so on to the MM base station MMeNB (ST 505).

In the cell search processing, when the mobile station UE has received a plurality of transmission beams (BF-SS signal), for example, the mobile station UE generates RACH preambles of all the transmission beams and transmits the generated RACH preambles together with reception quality information of the transmission beams to the MM base station MMeNB. Here, generation of PACH preambles may be limited to M transmission beams of best reception quality or transmission beams of predetermined reception quality or better. Further, reception quality information of a transmission beam (BF-SS signal) may be transmitted separately from its PRACH preamble.

After transmitting the BF-SS signal at ST 502, the MM base station MMeNB monitors the RACH preamble from the mobile station UE. Then, once receiving the RACH preamble, the MM base station MMeNB transmits a RACH response to the mobile station UE (ST 506). Here, this RACH response includes a preamble number detected in the MM base station MMeNB, transmission timing information and so on.

On the other hand, after transmitting the PRACH preamble at ST 505, the mobile station UE monitors the RACH response from the MM base station MMeNB. Then, once receiving the RACH response (ST 507), the mobile station UE obtains basic information including the system band width, system frame number (SFN), the number of transmission antennas from MIB (Master Information Block) included in the PBCH (Physical Broadcast Channel). Then, the mobile station UE uses this information as a basis to be connected to the MM base station MMeNB.

Figure 6:
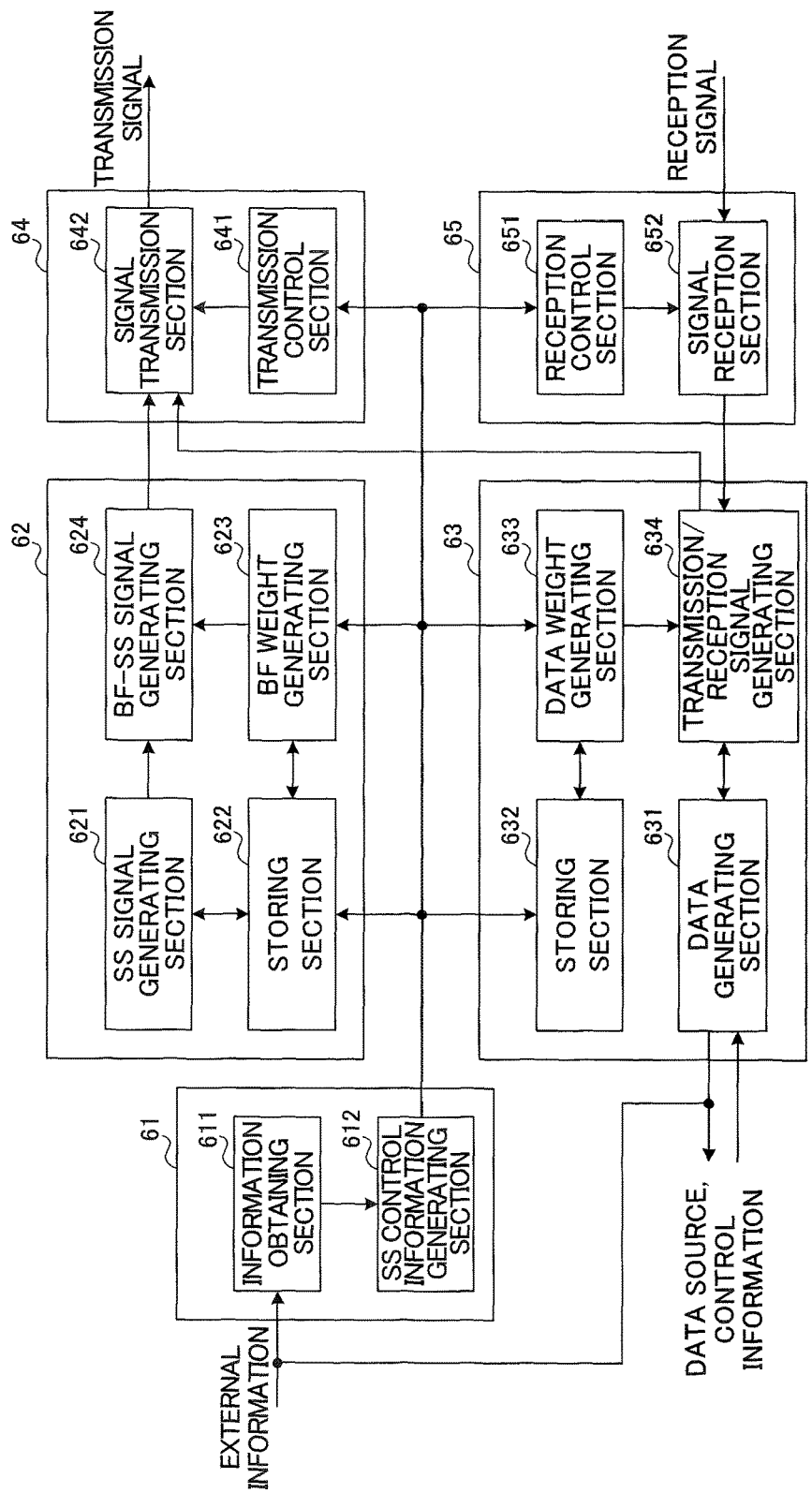
FIG. 6 is a block diagram for explaining the configuration of the Massive-MIMO base station according to the first and second embodiments.
Figure 7:
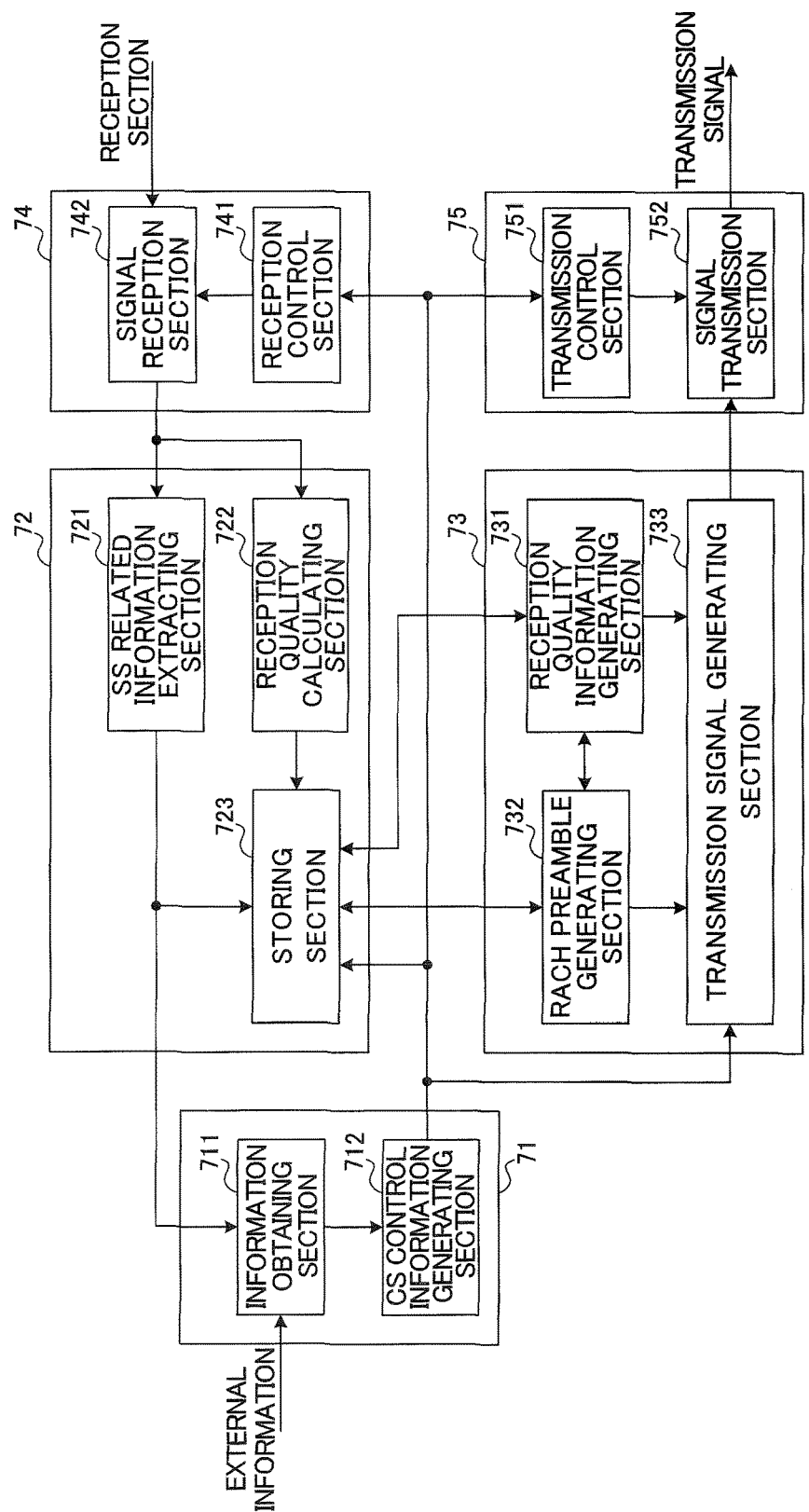
FIG. 7 is a block diagram for explaining the configuration of the mobile station according to the first and second embodiments.

Next description is made about the configuration examples of the MM base station MMeNB and the mobile station UE used in the above-mentioned methods of transmitting a BF-SS signal according to the first and second embodiments. FIG. 6 is a block diagram for explaining the configuration of the MM base station MMeNB used in the above-mentioned methods of transmitting a BF-SS signal according to the first and second embodiments. FIG. 7 is a block diagram for explaining the configuration of the mobile station UE used in the above-mentioned methods of transmitting a BF-SS signal according to the first and second embodiments.

Here, the configurations of the MM base station MMeNB and the mobile station UE illustrated in FIGS. 6 and 7 are simplified for easy explanation of the present invention and the MM base station MMeNB and the mobile station UE are sure to be provided with normal parts that a base station apparatus and a mobile station apparatus usually have. Particularly, in the mobile station UE illustrated in FIG. 7, structural elements related to data communication are omitted. In addition, for convenience of explanation, the MM base station MMeNB and mobile station UE in FIGS. 6 and 7 are described as having information obtaining sections 611, 711 for obtaining various-type information (external information) from the macro cell M or the like, but these structural elements may be omitted here.

As illustrated in FIG. 6, the MM base station MMeNB is configured to include a synchronization signal (SS) signal control section 61, an SS signal processing section 62, a data signal processing section 63, a transmission section 64 and a reception section 65. The SS signal control section 61 includes an information obtaining section 611 and an SS control information generating section 612. The SS signal processing section 62 has an SS signal generating section 621, a storing section 622, a BF weight generating section 623 and a BF-SS signal generating section 624. The data signal processing section 63 includes a data generating section 631, a storing section 632, a data weight generating section 633 and a transmission/reception signal generating section 634. The transmission section 64 has a transmission control section 641 and a signal transmission section 642. The reception section 65 has a reception control section 651 and a signal reception section 652.

The SS signal control section 61 provides the SS signal processing section 62, the data signal processing section 63, the transmission section 64 and the reception section 65 with information required for generation or transmission of BF-SS signals (SS control information). Particularly, if it obtains the external information from the macro cell M or the like, the SS signal control section 61 generates SS control information based on the external information and provides it to the SS signal processing section 62 or the like. The information obtaining section 611 obtains external information from the macro cell M or the like. Then, it outputs the obtained external information to the SS control information generating section 612. For example, the external information obtained from the macro cell M or the like includes information about the communication environment such as the number of mobile stations UE within the Massive-MIMO cell MM, the distance to a neighbor Massive-MIMO cell MM and so on.

The SS control information generating section 612 generates SS control information to use in the MM base station MMeNB, based on the external information received from the information obtaining section 611. This SS control information includes, for example, the beam width Φ for a BF-SS signal, the time interval τ for changing the transmission direction and a scanning method (including scanning mode). Then, the SS control information generating section 612 outputs the generated SS control information to the storing section 622 and the BF weight generating section 623 of the SS signal processing section 62, the storing section 632 and the data weight generating section 633 of the data signal processing section 63, the transmission control section 641 of the transmission section 64 and the reception control section 651 of the reception section 65.

Here, the SS control information generating section 612 is described as generating SS control information based on the external information obtained from the information obtaining section 611. If the information obtaining section 611 is not provided, the beam width Φ for a BF-SS signal, the time interval τ for changing the transmission direction and the scanning method (including scanning mode) are configured to be selectable as parameters in the communication system. The SS control information generating section 612 generates SS control information based on these parameters.

The SS signal processing section 62 generates a BF-SS signal based on the SS control information received from the SS signal control section 61 and outputs the signal to the transmission section 64. The storing section 622 has a database for storing the SS control information and information generated based on this SS control information (SS generation information). This database stores, for example, the SS control information received from the SS control information generating section 612 and SS generation information generated in the SS signal generating section 621 and the BF weight generating section 623. The SS generation information includes an SS signal and a BF weight fir the SS signal (BF weight). The BF weight may be managed in a table in advance.

The SS signal generating section 621 generates an SS signal based on the SS control information stored in the storing section 622 (database). Then, the SS signal generating section 621 outputs the generated SS signal to the BF-SS signal generating section 624 and the storing section 622. The BF weight generating section 623 generates a BF weight based on the SS control information received from the SS control information generating section 612. Then, the BF weight generating section 623 outputs the generated BF weight to the BF-SS signal generating section 624 and the storing section 622. When SS generation information (SS signal, BF weight) stored in the storing section 622 is available, the SS signal generating section 621 and the BF weight generating section 623 call up and outputs these to the BF-SS signal generating section 624. The BF-SS signal generating section 624 generates a BF-SS signal based on the SS signal from the SS signal generating section 621 and the BF weight from the BF weight generating section 623. The BF-SS signal generating section 624 outputs the generated BF-SS signal to the transmission section 64.

The data signal processing section 63 generates a beamformed transmission signal (BF transmission signal) based on the control information and data source instructed from the higher layer and outputs it to the transmission section 64. The data generating section 631 generates transmission data from the data source for transmission data and control information. For example, the storing section 632 stores weight generation information for transmission data received from the SS control information generating section 612. The data weight generating section 633 generates a data weight (transmission weight) based on weight generation information stored in the storing section 632. Then, the generated data weight is output to the transmission/reception signal generating section 634 and the storing section 632. The transmission/reception signal generating section 634 generates a beamformed transmission signal (BF transmission signal) based on the transmission weight from the data weight generating section 633 and the transmission data from the data generating section 631. Then, the transmission/reception signal generating section 634 outputs the generated BF transmission signal to the transmission section 64.

On the other hand, the data signal processing section 63 extracts data source and control information from a reception signal received in the reception section 65. The storing section 632 stores, for example, weight generation information for reception data received from the SS control information generating section 612. The data weight generating section 633 generates a data weight (reception weight) based on the weight generation information stored in the storing section 632. Then, the data weight generating section 633 outputs the generated data weight to the transmission/reception signal generating section 634 and the storing section 632. The transmission/reception signal generating section 634 receives a reception signal from the reception section 65. In addition, the transmission/reception signal generating section 634 generates a reception signal based on a reception weight received from the data weight generating section 633. Then, the transmission/reception signal generating section 634 outputs the generated reception signal to the data signal generating section 631. The data generating section 631 generates reception data based on this reception signal. Then, the data generating section 631 outputs the generated reception data to a higher structural element (for example, application processing section) (not shown).

The transmission section 64 receives the BF-SS signal or BF transmission signal from the SS signal processing section 62 or the data signal processing section 63 and transmits it on downlink. The transmission control section 641 controls transmission processing of the BF-SS signal by the signal transmission section 642 based on the SS control information received from the SS control information generating section 612. For example, the transmission control section 641 controls the time interval τ for transmission of the BF-SS signal by the signal transmission section 642. The signal transmission section 642 transmits the BF-SS signal and BF transmission signal under control of the transmission control section 641.

The reception section 65 receives a reception signal from the mobile station UE and outputs it to the data signal processing section 63. The reception control section 651 controls reception processing of a RACH preamble or the like by the signal reception section 652, based on the SS control information received from the SS control information generating section 612. The signal reception section 652 receives the RACH preamble and reception signal under control of the reception control section 651. The signal reception section 652 outputs the received PRACH preamble and reception signal to the data signal processing section 63.

On the other hand, the mobile station UE is configured to include a cell search (CS) control section 71, an SS signal processing section 72, a connection requesting section 73, a reception section 74 and a transmission section 75, as illustrated in FIG. 7. The CS control section 71 has an information obtaining section 711 and a CS control information generating section 712. The SS signal processing section 72 has an SS related information extracting section 721, a reception quality calculating section 722 and a storing section 723. The connection requesting section 73 has a reception quality information generating section 731, a RACH preamble generating section 732 and a transmission signal generating section 733. The reception section 74 has a reception control section 741 and a signal reception section 742. The transmission section 75 has a transmission control section 751 and a signal transmission section 752.

The CS control section 71 provides information required for the cell search processing (CS control information) to the SS signal processing section 72, the connection requesting section 73, the reception section 74 and the transmission section 75. Particularly, if external information is obtained from the macro cell M or the like, the CS control section 71 generates CS control information based on the external information and provides it to the SS signal processing section 72 or the like. The information obtaining section 711 obtains external information from the macro cell M or the like. For example, the external information from the macro cell M or the like includes information of a list of Massive-MIMO cell candidates (Massive-MIMO cell ID and cell position coordinates) and so on. The information obtaining section 711 obtains SS related information input from the SS related information extracting section 721 of the SS signal processing section 72. Then, the information obtaining section 711 outputs the obtained external information and SS related information to the CS control information generating section 712.

The CS control information generating section 712 generates CS control information to use in the mobile station UE, based on the SS related information and external information received from the information obtaining section 711. This CS control information includes, for example, the beam direction of a transmission beam of a BF-SS signal, beam width, signal length, frequency, bandwidth, scanning timing, scanning method and other information. Then, the CS control information generating section 712 outputs the generated CS control information to the storing section 723 of the SS signal processing section 72, the transmission signal generating section 733 of the connection requesting section 73, the reception control section 741 of the reception section 74 and the transmission control section 751 of the transmission section 75.

Here, the CS control information generating section 712 is described as generating CS control information based on the external information received from the information obtaining section 711. If the information obtaining section 711 is omitted, for example, the CS control information such as the beam direction and the beam width of a transmission beam of a BF-SS signal is configured to be selectable as parameters in the communication system. The CS control information generating section 712 generates SS control information based on these parameters.

The SS signal processing section 72 extracts and stores information related to an SS signal (SS related information) from the reception signal from the reception section 74 and outputs it to the CS control section 71. The SS related information extracting section 721 extracts the SS related information from the reception signal received from the reception section 74. The extracted SS related information includes a beam ID contained in the BF-SS signal. Then, the SS related information extracting section 721 outputs the extracted SS related information to the storing section 723 and the information obtaining section 711 of the CS control section 71. The reception quality calculating section 722 calculates reception quality of the reception signal received from the reception section 74. The reception quality calculating section 722 outputs the calculated reception quality to the storing section 723. The storing section 723 has a database for storing the SS related information and reception quality received from the SS related information extracting section 721 and the reception quality calculating section 722.

The connection requesting section 73 uses the CS control information from the CS signal control section 71 and the SS related information and reception quality stored in the SS signal processing section 72 as a basis to generates a transmission signal including a RACH preamble and reception quality information and outputs it to the transmission section 75. The reception quality information generating section 731 reads the reception quality from the storing section 723 of the SS signal processing section 72 and generates reception quality information. Then, the reception quality information generating section 731 outputs the generated reception quality information to the transmission signal generating section 733. The RACH preamble generating section 732 reads SS related information from the storing section 723 of the SS signal processing section 72 and generates RACH preamble. Then, the RACH preamble generating section 732 outputs the generated RACH preamble to the transmission signal generating section 733. The transmission signal generating section 733 generates a transmission signal including the RACH preamble and reception quality information and outputs the generated transmission signal to the transmission section 75.

The reception section 74 receives a reception signal from the MM base station MMeNB and outputs it to the SS signal processing section 72. The reception control section 741 uses the CS control information received from the CS control information generating section 712 as a basis to control reception processing of a BF-SS signal or the like by the signal reception section 742. For example, the reception control section 741 controls the reception timing of the BF-SS signal by the signal reception section 742 and the like. The signal reception section 742 receives a BF-SS signal under control of the reception control section 741. Then, the signal reception section 742 outputs the received BF-SS signal to the SS signal processing section 72.

The transmission section 75 transmits a transmission signal from the connection requesting section 73, to the MM base station MMeNB on uplink. The transmission control section 751 uses the CS control information received from the CS control information generating section 712 as a basis to control transmission processing of the transmission signal by the signal transmission section 752. For example, the transmission control section 751 controls the transmission timing of the transmission signal by the signal transmission section 752 or the like. The signal transmission section 752 transmits the transmission signal under control of the transmission control section 751.

Figure 8:
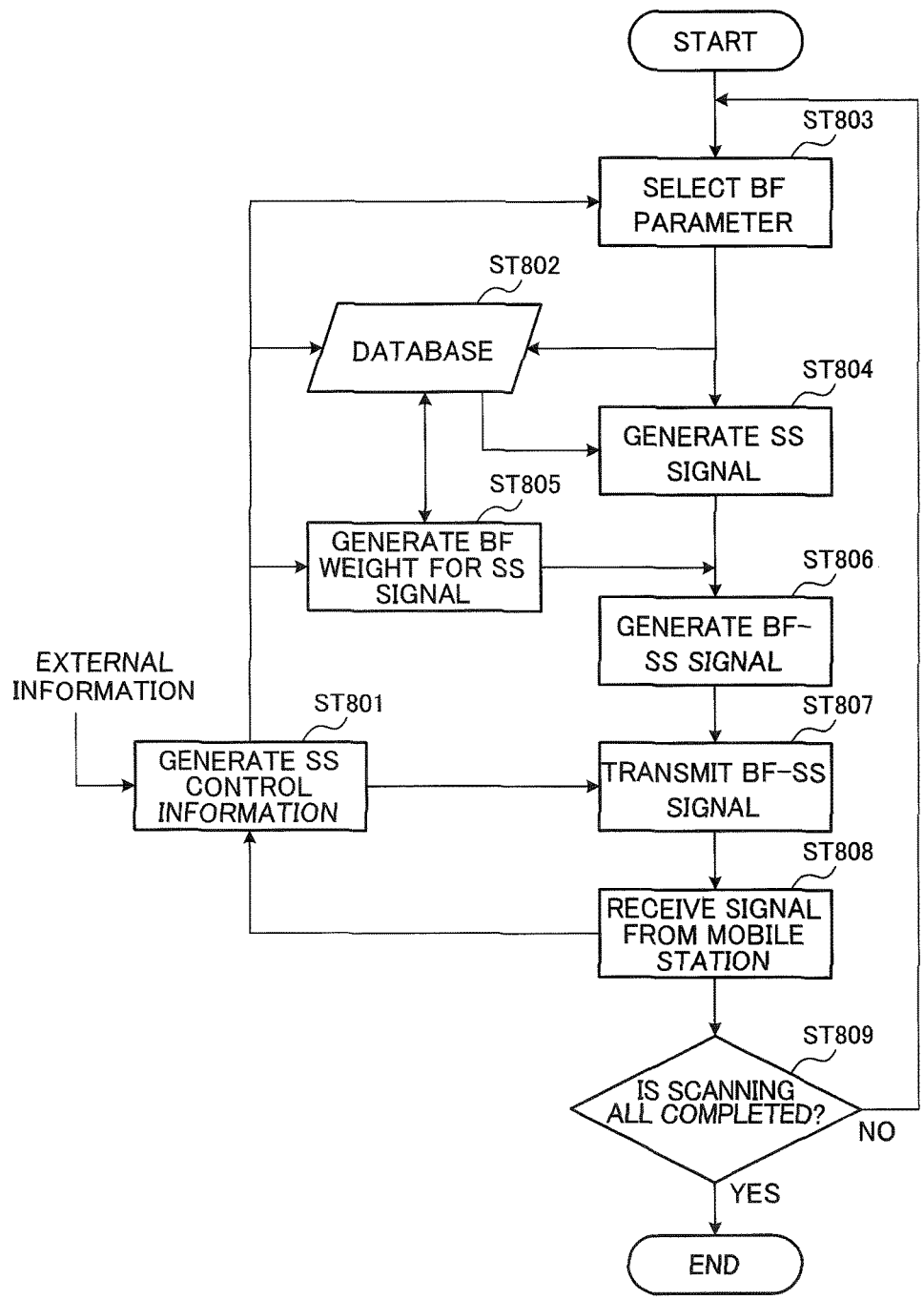
FIG. 8 is a flowchart for explaining the operation of transmitting a BF-SS signal from the Massive-MIMO base station according to the first and second embodiments.
Figure 9:
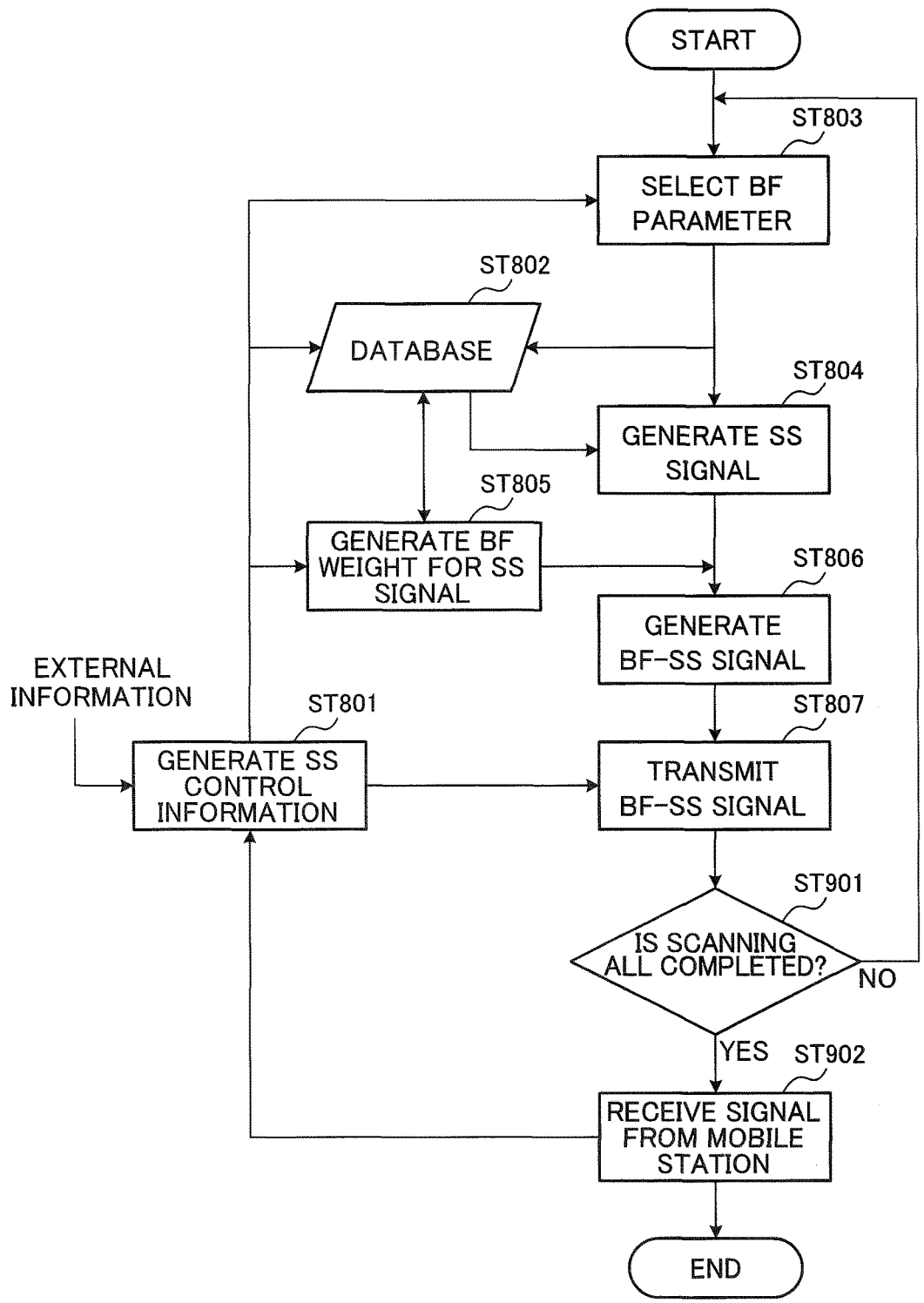
FIG. 9 is a flowchart for explaining the operation of transmitting a BF-SS signal from the Massive-MIMO base station according to the first and second embodiments.
Figure 10:
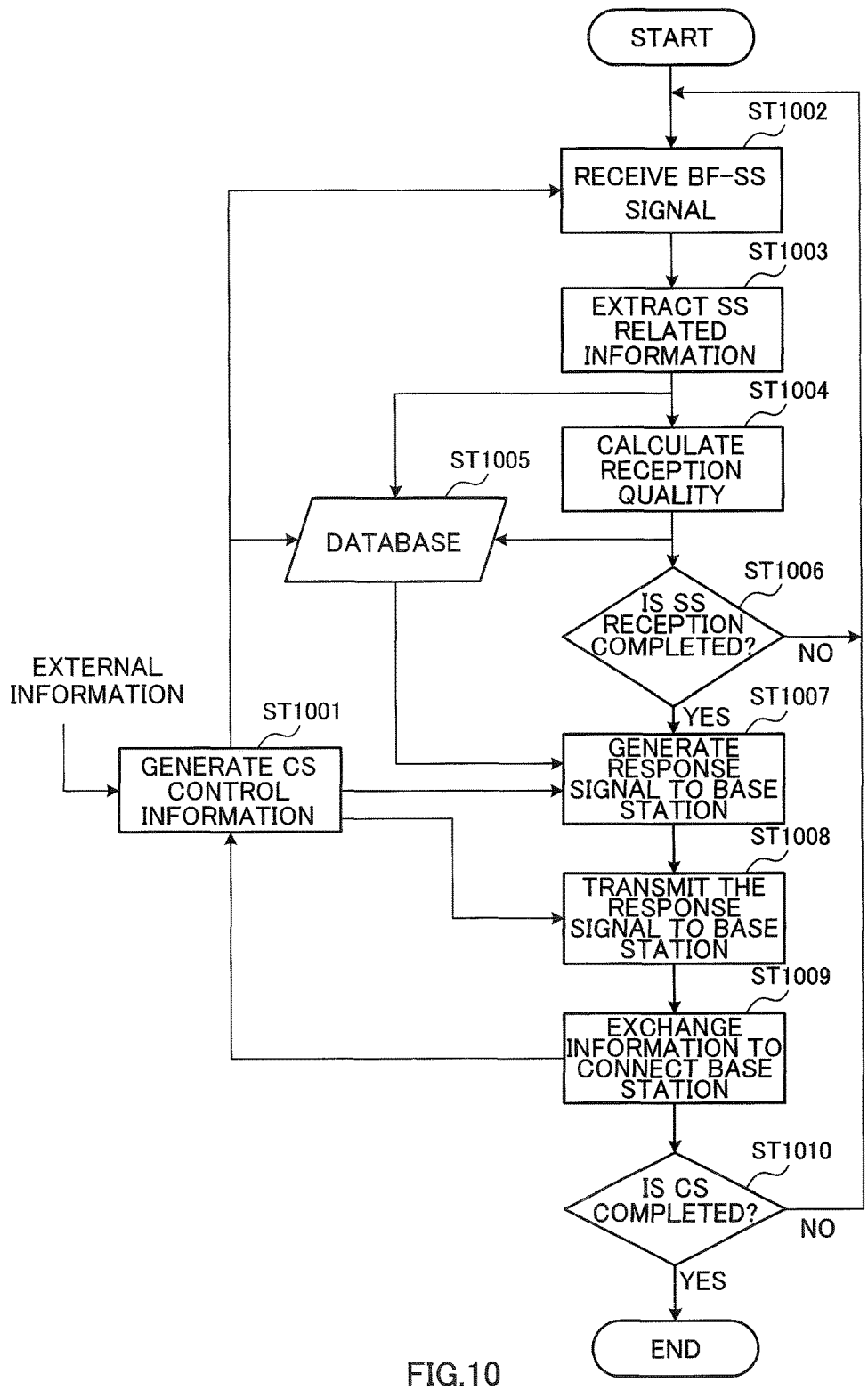
FIG. 10 is a flowchart for explaining the operation of receiving a BF-SS signal at the mobile station according to the first and second embodiments.
Figure 11:
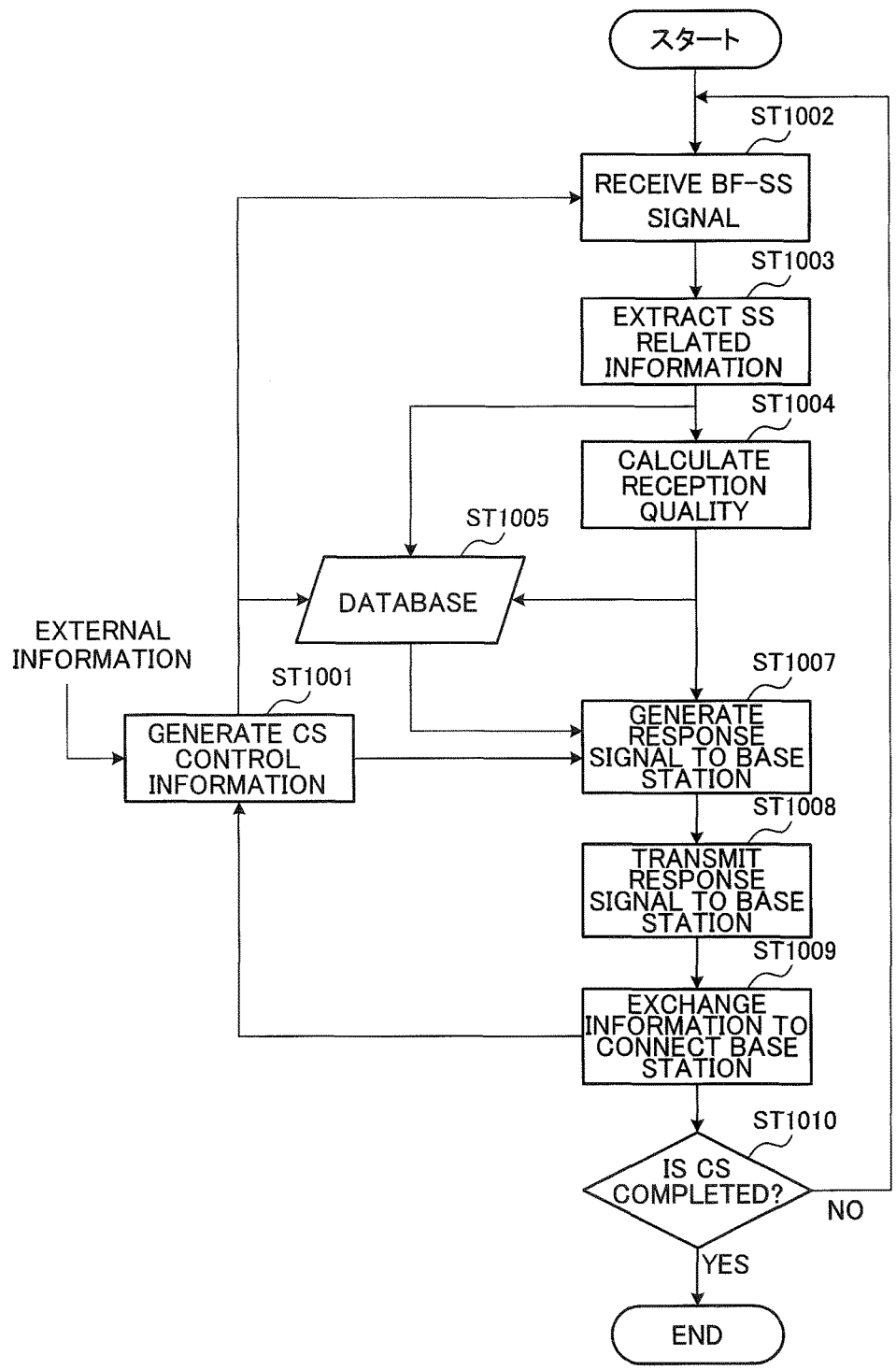
FIG. 11 is a flowchart for explaining the operation of receiving a BF-SS signal at the mobile station according to the first and second embodiments.

Next description is made about the operation of these MM base station MMeNB and mobile station UE. FIGS. 8 and 9 are flowcharts for explaining the operation of transmitting a BF-SS signal from the MM base station MMeNB used in the methods of transmitting a BF-SS signal according to the first and second embodiments. FIGS. 10 and 11 are flowcharts for explaining the operation of receiving a BF-SS signal from the mobile station UE used in the methods of transmitting a BF-SS signal according to the first and second embodiments. Here, the flowchart of FIG. 9 is prepared by changing a part of the operational flow illustrated in FIG. 8 and the processes in common with those of FIG. 8 are denoted by like references and their explanation is omitted here. Also, the flowchart of FIG. 11 is prepared by changing a part of the operational flow illustrated in FIG. 10 and the processes in common with those of FIG. 10 are denoted by like references and their explanation is omitted here.

As illustrated in FIG. 8, when transmitting a BF-SS signal, in the MM base station MMeNB, the SS signal control section 61 generates SS control information based on the external information (ST 801). The SS control information generated at ST 801 is output to the database in the storing section 622 of the SS signal processing section 62 and the BF weight generating section 623 and the transmission control section 641 of the transmission section 64. The storing section 622 stores this SS control information in the database (ST 802).

Then, the SS control information generating section 612 selects BF parameters (ST 803). For example, the SS control information generating section 612 selects the beam width ϕ for a BF-SS signal, the time interval τ for changing the transmission direction and the scanning method (including a scanning mode). The SS signal generating section 621 generates an SS signal based on these BF parameters (ST 804). The generated SS signal is output to the BF-SS signal generating section 624. The BF parameters selected in the SS control information generating section 612 are output and stored in the database. The SS signal generating section 621 is able to generate an SS signal based on the BF parameters stored in the database.

On the other hand, the BF weight generating section 623 generates a BF weight (BF weight for SS signal) based on the SS control information received from the SS signal control section 61 (ST 805). Then, the generated BF weight is output to the BF-SS signal generating section 624.

The BF-SS signal generating section 624 generates a BF-SS signal in accordance with these SS signal and BF weight (ST 806). The generated BF-SS signal is output to the signal transmission section 624 of the transmission section 64. The signal transmission section 642 transmits this BF-SS signal on downlink (ST 807). In this case, the transmission control section 641 controls transmission of the BF-SS signal by the signal transmission section 642 based on the SS control information received from the SS signal control section 61. With this process, a transmission beam (BF-SS signal) is transmitted, for example, in the transmission direction of timing $t_1$ illustrated in FIG. 3A.

After transmission of the BF-SS signal, in the MM base station MMeNB, the reception control section 651 of the reception section 65 monitors reception of a signal (RACH preamble) from the mobile station UE (ST 808). Taking the above-mentioned example, it monitors reception of the RACH preamble from the mobile station UE that has received the transmission beam at timing $t_1$. When the MM base station MMeNB receives the RACH preamble from the mobile station UE, the information included in the RACH preamble is output to the SS signal control section 61. In the SS signal control section 61, this information included in the RACH preamble is used as a basis to further generate SS control information.

Next, the SS signal control section 61 determines whether scanning to whole of SA of the Massive-MIMO cell is completed or not (in other words, BF-SS signal is transmitted to whole of the SA) (ST 809). If scanning to whole of the SA of the Massive-MIMO cell MM is not completed, the processing is returned to ST 803 and the steps ST 803 to ST 809 are repeated. Taking the above-mentioned example, after the transmission beam is transmitted at timing $t_1$, the transmission beam (BF-SS signal) is transmitted in the transmission direction of timing $t_2$. Then, in ST 809, if it is determined that scanning of whole the SA of the Massive-MIMO cell is completed, the processing ends. Here, when it is determined that scanning of whole of the SA of the Massive-MIMO cell MM is completed, for example, it means that the BF-SS signal is transmitted in all the directions illustrated in FIG. 3A.

In the operational flow illustrated in FIG. 8, after transmitting the BF-SS signal at ST 807, the MM base station MMeNB waits for signal reception from the mobile station UE before generating a new transmission beam for the BF-SS signal. In the operational flow illustrated in FIG. 9, after transmitting the BF-SS signal at ST 807, the MM base station MMeNB does not wait for signal reception from the mobile station UE but generates a new transmission beam for the BF-SS signal, which is a different point from the operational flow illustrated in FIG. 8.

In the operational flow illustrated in FIG. 9, after transmission of a BF-SS signal at ST 807, the SS signal control section 61 determines whether or not scanning to whole of the SA of the Massive-MIMO cell is completed (that is, whether or not the BF-SS signal is transmitted to whole of the SA) (ST 901). If scanning to whole of the SA of the Massive-MIMO cell MM is not completed, the processing is returned to ST 803 and the steps ST 803 to ST 807 and ST 901 are repeated.

If scanning to whole of the SA of the Massive-MIMO cell MM is completed, the reception control section 651 of the reception section 65 monitors reception of a signal (RACH preamble) from the mobile station UE (ST 902). When the RACH preamble from the mobile station UE is received, information included in the RACH preamble is output to the SS signal control section 61 (information obtaining section 611). In the operational flow illustrated in FIG. 9, for example, after transmission of the last BF-SS signal and elapse of a certain time period, the processing ends.

Thus, in the MM base station MMeNB, as the synchronization signal (BF-SS signal) is generated with a beamforming weight that varies for every time interval τ, the synchronization signal is able to reach the position far away from the Massive-MIMO base station MMeB. With this structure, it becomes possible to perform the cell search processing in the mobile station UE properly, thereby preventing reduction in throughput due to problems in the cell search processing.

When receiving the BF-SS signal, in the mobile station UE, as illustrated in FIG. 10, the CS signal control section 71 generates CS control information based on the external information (ST 1001). The CS control information generated at ST 1001 is output to the storing section 723 of the SS signal processing section 72, the reception control section 741 of the reception section 74, the transmission signal generating section 733 of the connection requesting section 73 and the transmission control section 751 of the transmission section 75. The CS control information output to the storing section 723 is stored in the database.

When receiving the CS control information, the signal reception section 742 of the reception section 74 monitors reception of the BF-SS signal. Then, receiving the BF-SS signal (ST 1002), the signal reception section 742 outputs the BF-SS signal to the SS related information extracting section 721 of the SS signal processing section 72. In this case, the reception control section 741 controls reception of the BF-SS signal by the signal reception section 742 based on the CS control information received from the CS signal control section 71.

When receiving the BF-SS signal, the SS related information extracting section 721 extracts the SS related information contained in the BF-SS signal (ST 1003). The extracted SS related information is output to the storing section 723. This SS related information includes a beam ID that is assigned uniquely to the BF-SS signal. That is, when the BF-SS signal is received in the mobile station UE, the beam ID assigned to the BF-SS signal is extracted and output to the storing section 723.

On the other hand, when receiving the BF-SS signal, the reception quality calculating section 722 calculates reception quality of the BF-SS signal (ST 1004). The calculated reception quality is output to the storing section 723. The storing section 723 stores these SS related information and reception quality in the database (ST 1005). Here, in this description, it is assumed that the reception quality is calculated after extraction of the SS related information, however, these steps may be performed in reverse order.

When the SS related information and reception quality are stored in the database, the reception control section 741 of the reception section 74 determines whether reception of the BF-SS signal is completed or not (ST 1006). When reception of the BF-SS signal is not completed, the processing is returned to the step ST 1002, and the steps ST 1002 to ST 1006 are repeated. On the other hand, when the reception of the BF-SS signal is completed, the processing goes ahead to ST 1007.

In ST 1007, the connection requesting section 73 generates a transmission signal (response signal) for the MM base station MMeNB. More specifically, the reception quality information generating section 731 generates reception quality information based on the reception quality in the storing section 723 (database), while the RACH preamble generating section 732 generates a RACH preamble based on the SS related information in the storing section 723 (database). In this case, the RACH preamble generated by the RACH preamble generating section 732 includes the beam ID assigned to the BF-SS signal. Then, the transmission signal generating section 733 generates a transmission signal including these reception quality information and RACH preamble. In this case, the transmission signal generating section 733 generates a transmission signal based on CS control information received from the CS control information generating section 712. The transmission signal generating section 733 may generate the transmission signal based on the CS control information stored in the database. The generated transmission signal is output to the transmission section 75.

When receiving the transmission signal from the transmission signal generating section 733, the signal transmission section 752 of the transmission section 75 transmits the transmission signal (response signal) to the MM base station MMeNB (ST 1008). In this case, the transmission control section 752 controls transmission of the transmission signal (response signal) by the signal transmission section 752, based on the CS control information received from the CS signal control section 71.

When the transmission signal (response signal) is transmitted to the MM base station MMeNB, the reception control section 741 monitors reception of a RACH response from the MM base station MMeNB. Then, the mobile station UE exchanges information using the RACH response or the like and is connected to the MM base station MMeNB (ST 1009). The information obtained by this information exchange is output to the CS control section 71 and is used in generation of the CS control information.

When connection with the MM base station MMeNB is completed, the mobile station UE (CS control section 71) determines whether the cell search (CS) processing is completed or not (ST 1010). When the cell search processing is not completed, the processing is returned to the step ST 1002 and the steps ST 1002 to ST 1010 are repeated. On the other hand, when the cell search processing is completed, a series of steps ends.

In the operational flow illustrated in FIG. 10, it is determined whether reception of the BF-SS signal is completed or not at ST 1006, and if reception of the BF-SS signal is completed, the transmission signal to the MM base station MMeNB (response signal) is generated. In the operational flow illustrated in FIG. 11, the step of determining whether reception of the BF-SS signal is completed or not is omitted. This is a difference from the operational flow illustrated in FIG. 10.

In the operational flow illustrated in FIG. 11, the storing section 723 stores the SS related information and reception quality in the database at ST 1005, the steps ST1007 to ST 1010 are performed without determining whether reception of the BF-SS signal is completed or not. Then, like in the processing illustrated in FIG. 10, if the cell search processing is not completed at ST 1010, the processing is returned to the step ST 1002, and the steps ST 1002 to ST 1010 (excluding ST 1006) are repeated. On the other hand, when the cell search processing is completed, a series of steps ends.

Thus, when the BF-SS signal is received, the mobile station UE generates the RACH preamble including the information for identifying the BF-SS signal (beam ID) and transmits the transmission signal including this RACH preamble to the MM base station MMeNB thereby to perform a connection request. With this structure, even when beamforming is applied to the synchronization signal, the mobile station UE is able to identify the BF-SS signal and perform the cell search processing properly, thereby making it possible to prevent reduction in throughput performance due to problems in the cell search processing.

In addition, if external information is obtained in advance from the macro cell M or the like, the external information is used to be able to reduce the burden of the cell search processing. This external information includes, for example, timing information, resource allocation information and other system parameters, a candidate list of Massive-MIMO cells MM (Massive-MIMO cell IDs and cell positional coordinates), beam direction and beam width of each transmission beam of a BF-SS signal, signal length, frequency, bandwidth, scanning timing, scanning method and any other information.

This external information is considered as being obtained, for example, from the connected macro base station MeNB or a neighbor MM base station MMeNB. These macro base station MeNB and MM base station MMeNB constitute external communication apparatuses. In the mobile station UE, if this external information is obtained in advance, for example, it is possible to omit a part of the processing for generating CS control information and the processing for generating RACH preamble, thereby making it possible to reduce the burden of the cell search processing.

In addition, if the external information is obtained from the connected macro base station MeNB or neighbor MM base station MMeNB, these external communication apparatuses (macro base station MeNB and MM base station MMeNB) may be used to transmit the RACH preamble. In this case, connection request is able to be made even when connection with the MM base station MMeNB as a target for connection request is not established.

Here, the present invention is not limited to the above-described embodiments, and may be embodied in various modified forms. For example, the number of carriers, the carrier bandwidth, signaling method, the number of processing sections and the processing order in the above description may be modified appropriately, without departing from the scope of the present invention. Any other modifications may be also made without departing from the scope of the present invention.

(First Modification)

For example, in the method of transmitting a BF-SS signal according to the first embodiment, beamforming is performed to generate a single narrow beam thereby to transmit the BF-SS signal. However, the transmission beam for transmission of the BF-SS signal is not limited to this and may be modified appropriately. For example, multiple narrow beams are generated simultaneously by beamforming thereby to transmit the BF-SS signal. In the following description, each narrow beam of a group of narrow beams (beam group) is called "subbeam".

Figure 12A:
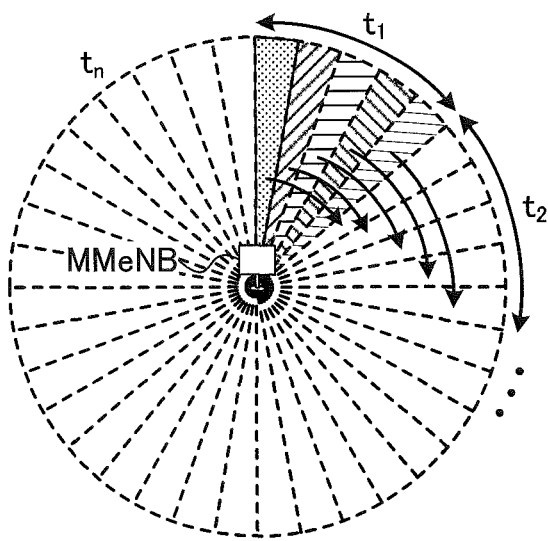
FIG. 12 provides explanatory diagrams for explaining the method of transmitting a BF-SS signal according to a first modified example.
Figure 12B:
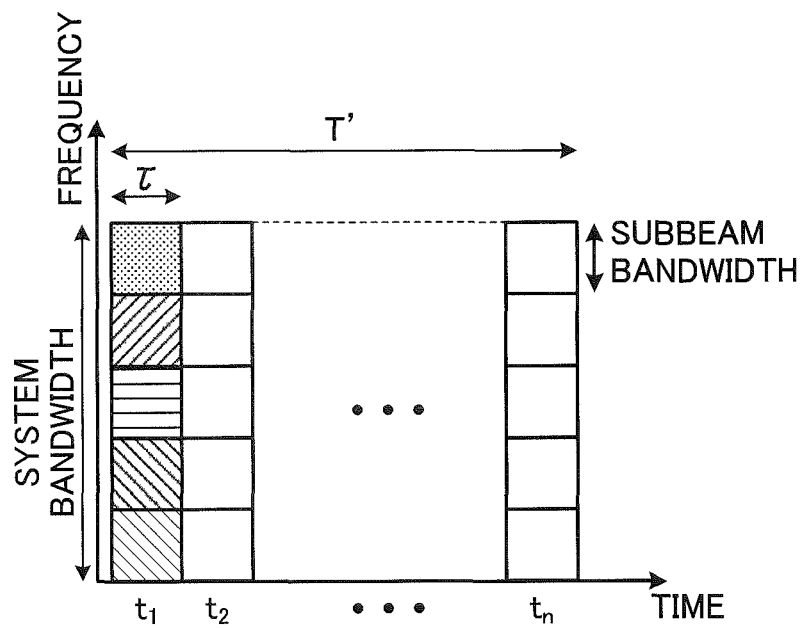

FIG. 12 provides explanatory diagrams of the method of transmitting a BF-SS signal according to the first modified example. FIG. 12A schematically illustrates the image of transmitting a BF-SS signal from the MM base station MMeNB to SA. FIG. 12B illustrates BF-SS signal beams transmitted from the MM base station MMeNB on the time and frequency axes.

As illustrated in FIG. 12A, according to the method of transmitting a BF-SS signal according to the first modified example, a beam group including five subbeams of different transmission directions (beam width of each subbeam is $\Phi$) is transmitted simultaneously at timing $t_1$. Then, at timing $t_2$, the beam group is transmitted in the transmission directions that are shifted in the azimuthal angle direction by 5 times the beam width $\Phi$. Likewise, transmission of the beam group is repeated in the transmission directions that are shifted in the azimuthal angle direction by 5 times the beam width $\Phi$ for every time interval $\tau$. At timing $t_n$, the beam group is transmitted in the transmission directions that are adjacent to the transmission directions at timing t1, and thereby, scanning of whole of SA of the Massive-MIMO cell MM (in all directions) is completed.

Thus, in the method of transmitting a BF-SS signal according to the first modified embodiment, a plurality of subbeams are transmitted simultaneously as a beam group in mutually different transmission directions that are shifted for every time interval $\tau$. With this structure, the time required for scanning of whole of SA of the Massive-MIMO cell is able to be shorter than that in the method of transmitting a BF-SS signal according to the first embodiment. For example, when the number of subbeams in a beam group is "b", the scanning time T' of whole SA can be shortened to 1/b of the total time T required for transmission of a BF-SS signal according to the first embodiment.

In the method of transmitting a BF-SS signal according to the first modified embodiment, subbeams included in the beam group are able to be generated by, for example, using a part of antenna elements (for example, 10 antenna elements included in 100 antenna elements).

Figure 13B:
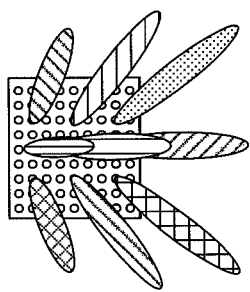
FIG. 13 provides schematic diagrams of a group of beams that are transmitted by the method of transmitting a BF-SS signal according to the first modified example.
Figure 13A:
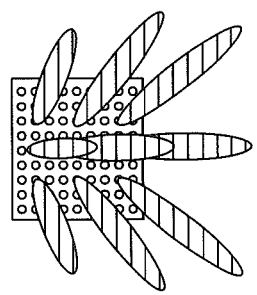

Further, in the method of transmitting a BF-SS signal according to the first modified embodiment, subbeams included in the beam group are orthogonal to each other. For example, the orthogonal relation between subbeams is realized by frequency division multiplexing based on different frequency bands, space division multiplexing using 3D beamforming and combination of these frequency division multiplexing and space division multiplexing. FIG. 13A schematically illustrates the beam group of which subbeams are generated by space division multiplexing using 3D beamforming to be orthogonal to each other. FIG. 13B schematically illustrates the beam group of which subbeams are generated by combination of space division multiplexing using 3D beamforming and frequency division multiplexing to be orthogonal to each other.

In the method of transmitting a BF-SS signal according to the first modified embodiment, if the mobile station UE obtains control information related to subbeams that make up the beam group (for example, the number of subbeams and multiplexing direction) in advance, reception of the BF-SS signal becomes easy. Therefore, when the method of transmitting a BF-SS signal according to the first modified embodiment is applied, it is preferable that the mobile station UE obtains such subbeam control information in advance from the macro base station MeNB or other base station apparatus in connection.

In addition, like in the method of transmitting a BF-SS signal according to the first modified embodiment, if subbeams are multiplexed (by frequency division multiplexing, space division multiplexing or a combination thereof), each subbeam is assigned with an identifiable identifier (beam ID) so that the mobile station UE is able to specify each subbeam. Further, subbeam IDs are prepared by using mutually orthogonal sequences, it is possible to simplify the processing at the mobile station UE side.

(Second Modification)

In the method of transmitting a BF-SS signal according to the first modified embodiment, the BF-SS signal is transmitted for every time interval $\tau$ by using the bandwidth of the communication system as a whole. However, the transmission beam for transmission of the BF-SS signal (hereinafter referred to as "SS beam") is not limited to this, but may be modified appropriately. For example, the BF-SS signal that is transmitted for every time interval $\tau$ may be transmitted using a part of the bandwidth of the communication system.

Figure 14A:
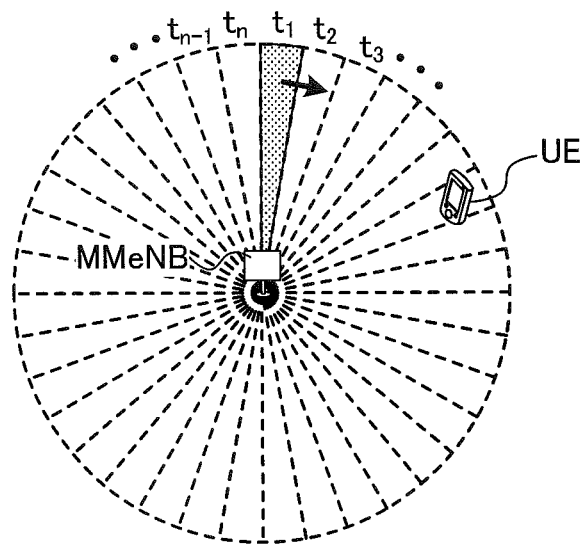
FIG. 14 provides explanatory diagrams for explaining the method of transmitting a BF-SS signal according to a second modified example.
Figure 14B:
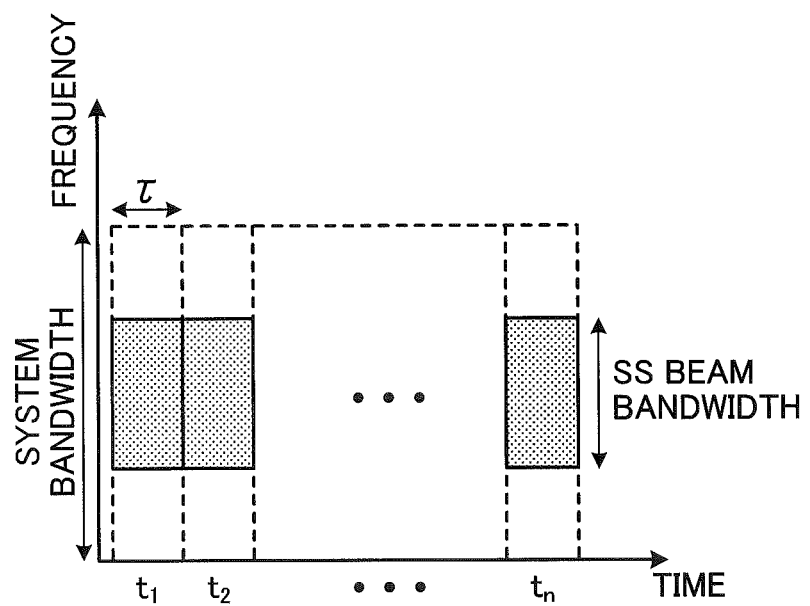

FIG. 14 provides explanatory diagrams of a method of transmitting a BF-SS signal according to the second modified embodiment. FIG. 14A schematically illustrates the image of transmitting a BF-SS signal from the MM base station MMeNB to SA, and FIG. 14B illustrates BF-SS signal beams transmitted from the MM base station MMeNB, on the time and frequency axes.

In the method of transmitting a BF-SS signal according to the second modified embodiment, as illustrated in FIG. 14B, the BF-SS signal is transmitted for every time interval $\tau$ using a part of the bandwidth of the communication system. As the bandwidth of the SS beam is thus narrowed, it is possible to improve the reception power density. In this case, even with the same transmission power, the power density (electric flux density) can be improved by restricting use of transmission power to the narrow bandwidth, thereby making is possible to transmit the SS signal for great distances. In the method of transmitting a BF-SS signal according to the second modified embodiment, the bandwidth of the SS beam may be configured to be selectable as a parameter in the communication system.

The method of transmitting a BF-SS signal according to the second modified embodiment may be used in combination with the method of transmitting a BF-SS signal according to the first modified embodiment.

(Third Modification)

In the method of transmitting a BF-SS signal according to the first embodiment, the BF-SS signal is transmitted by changing the transmission direction of a transmission beam of fixed beam width. However, the SS beam is not limited to this, but may be modified appropriately. For example, the BF-SS signal is able to be transmitted by adjusting the beam width of the SS beam stepwisely.

For example, in the method of transmitting a BF-SS signal according to the third modified embodiment, it may be configured that a plurality of beam widths of the SS beam are prepared in advance, and the SS beam is changed from the wide beam width to the narrow beam width. More specifically, at the first step, an SS beam of the widest beam width is used to scan whole of SA thereby to determine an area where the mobile station UE is located. Then, an SS beam of narrower beam width is used to scan only the area where the mobile station UE is located, thereby to further define the area where the mobile station UE is located. Then, this scanning is repeated up to an SS beam of the narrowest beam width is used to scan the area.

FIG. 15 provides explanatory diagrams of an example of the method of transmitting a BF-SS signal according to the third modified embodiment. Here, it is assumed that the widest beam width of an SS beam is set to ¼ of SA and the narrowest beam width is set to 1/32 of SA.

Figure 15A:
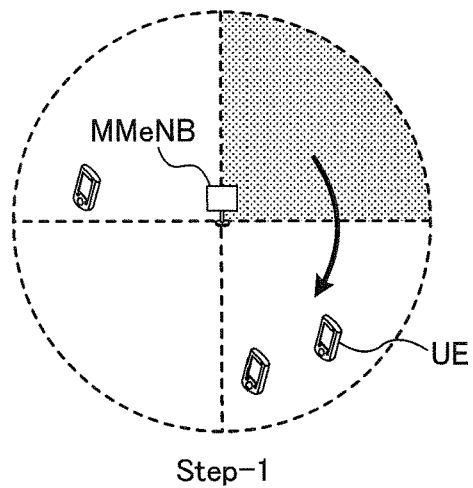
FIG. 15 provides explanatory diagrams for explaining the method of transmitting a BF-SS signal according to a third modified example.
Figure 15B:
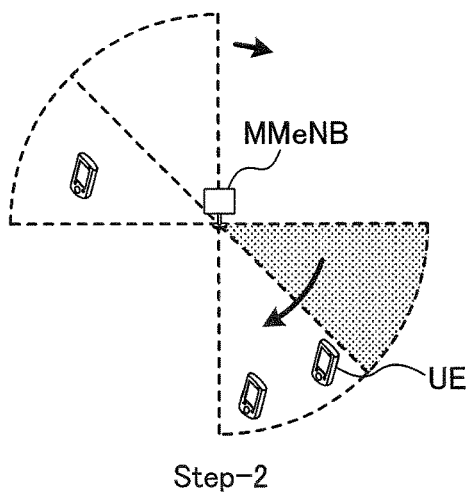
Figure 15C:
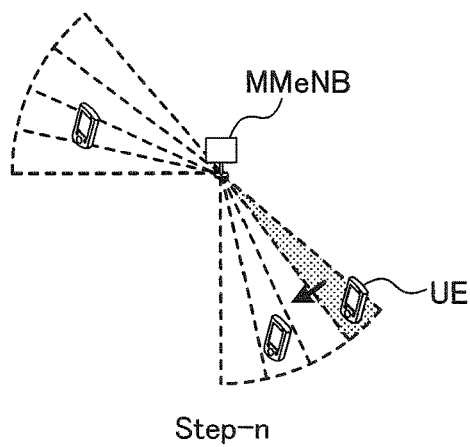

In the method of transmitting a BF-SS signal according to the third modified embodiment, first as illustrated in FIG. 15A, an SS beam of which the beam width is ¼ of SA is used to scan whole of SA. In this step, the area where the mobile station UE is located is selected, and then, as illustrated in FIG. 15B, the beam width of the SS beam is reduced by one step and the SS beam of which the beam width is ⅛ of SA is used to scan the area where the mobile station UE is located in a restricted manner. The SS beam is thus reduced in its beam width stepwisely, and finally, as illustrated in FIG. 15C, an SS beam with the beam width of 1/32 of SA is used to scan the area where the mobile station UE is located in a more restricted manner.

In this way, in the method of transmitting a BF-SS signal according to the third modified embodiment, the beam width of the SS beam is adjusted step-by-step to scan the mobile station UE, which enables reduction in the number of processing times required for the scanning processing and the scanning area. This makes it possible to perform the scanning processing (BF-SS signal transmission processing) while reducing the processing load in the MM base station MMeNB.

In the method of transmitting a BF-SS signal according to the third modified embodiment, for example, when a broader beam is used in scanning at the first or first-half step, the power density of the beam becomes lower than that of the beam used in latter-half scanning so that the beam reach becomes short. Even in this case, if it is used in combination with the second modified embodiment (narrow bandwidth), it becomes possible to cover the same range with a beam of different width. In addition, in data communication, it is preferable to use the narrowest beam as mentioned above (beam of biggest gain). Therefore, it is also preferable that the narrowest width of the beam used in the final scanning is set to the same as the width of a beam used in data communication.

Particularly, in the method of transmitting a BF-SS signal according to the third modified embodiment, if the MM base station MMeNB is able to obtain, in advance, communication environment information including a distance to a neighbor cell, distribution of mobile stations UE and positional information, it is possible to omit the scanning processing using a beam of wide beam width before selection of the area where the mobile station UE is located. Therefore, when the method of transmitting a BF-SS signal according to the third modified embodiment is applied, it is preferable that the MM base station MMeNB obtains, in advance, such communication environment information from the macro base station MeNB.

Here, the method of transmitting a BF-SS signal according to the third modified embodiment may be used in combination of any of the methods of transmitting a BF-SS signal according to the first and second modified embodiments.

Besides, the methods of transmitting a BF-SS signal according to the first to third modified embodiments are also applicable to the method of transmitting a BF-SS signal according to the second embodiment. Particularly, when the method of transmitting a BF-SS signal according to the third modified embodiment is applied to the 3D scanning mode in the second embodiment, it is preferable to select parameters including the beam width and time interval in consideration of change in irradiation range (power density) according to the elevation angle of an SS beam as mentioned above, uniformity in scanning of BF-SS signal within SA and its efficiency. In this case, for example, by changing the beam width between a high elevation angle case and a low elevation angle case, it is possible to achieve commonality of power density and assure uniformity of BF-SS signal scanning.

Further, in the methods of transmitting a BF-SS signal according to the first and second embodiments, if the MM base station MMeNB obtains, in advance, external information from an external communication apparatus such as a macro cell M, the obtained external information may be used as a basis to calculate a BF weight adaptively. In this case, as a specific example, the external information from the external communication apparatus includes distribution and positional information of mobile stations US, user priority, positional information of a neighbor base station and so on.

Furthermore, in the methods of transmitting a BF-SS signal according to the first and second embodiments, for example, if a higher control node such as a central control station CC is used to adjust information to supply to the MM base station MMeNB intendedly, it becomes possible to control the communication state in the Massive-MIMO cell MM. Such control of the communication state in the Massive-MIMO cell MM, for example, it is possible to control the communication state in consideration of interference to other communication systems, load balance of the communication system as a whole, user satisfaction level and so on.

The disclosure of Japanese Patent Application No. 2013-170814, filed on Aug. 20, 2013, including the specification, drawings, and abstract, is incorporated herein by reference in its entirety.

The invention claimed is:

1. A synchronization signal transmitting method of controlling a transmission direction of a transmission beam for a synchronization signal used in cell search by beamforming using a plurality of antenna elements provided in a base station apparatus, the synchronization signal transmitting method comprising:

a synchronization signal processing step of generating the synchronization signal including information to identify the transmission beam for the synchronization signal and changing a beamforming weight for the synchronization signal at every given time interval;

a selecting step of selecting beamforming parameters including at least the time interval for changing the beamforming weight and a beam width of the transmission beam for the synchronization signal; and a transmission step of transmitting the synchronization signal generated with the beamforming weight in downlink, wherein, in the synchronization signal processing step, the beamforming parameters selected in the selecting step are used as a basis to control the beamforming weight and the time interval for changing the beamforming weight, and wherein, in the selecting step, the time interval for changing the beamforming weight is determined based on a signal length of the synchronization signal.

2. The synchronization signal transmitting method according to claim 1, wherein in the synchronization signal processing step, the beamforming weight is selectable between a beamforming weight for controlling the transmission direction of the transmission beam for the synchronization signal in an azimuthal angle direction and a beamforming weight for controlling the transmission direction in the azimuthal angle direction and in an elevation angle direction.

3. The synchronization signal transmitting method according to claim 1, wherein, in the selecting step, the beam width of the transmission beam for the synchronization signal is determined based on at least one of a number of antenna elements in the base station apparatus, transmission power, frequency band, bandwidth and beam irradiation range.

4. The synchronization signal transmitting method according to claim 1, wherein, in the synchronization signal processing step, the beamforming weight comprises a beamforming weight for generating a beam group including a plurality of transmission beams for the synchronization signal.

5. The synchronization signal transmitting method according to claim 1, wherein, in the transmission step, the transmission beam for the synchronization signal is transmitted using a part of a bandwidth of a communication system.

6. The synchronization signal transmitting method according to claim 1, further comprising an obtaining step of obtaining information for generating the transmission beam for the synchronization signal from an external communication apparatus, and wherein the information obtained in the obtaining step is used as a basis to select the beamforming weight.

7. A base station apparatus for controlling a transmission direction of a transmission beam for a synchronization signal used in cell search by beamforming using a plurality of antenna elements, the base station apparatus comprising:

a processor that generates the synchronization signal including information to identify the transmission beam for the synchronization signal and changes a beamforming weight for the synchronization signal at every given time interval;

the processor selects beamforming parameters including at least the time interval for changing the beamforming weight and a beam width of the transmission beam for the synchronization signal; and a transmitter that transmits the synchronization signal generated with the beamforming weight in downlink, wherein the beamforming parameters selected by the processor are used as a basis to control the beamforming weight and the time interval for changing the beamforming weight, and wherein the time interval for changing the beamforming weight is determined by the processor based on a signal length of the synchronization signal.

* * * * *